(12) United States Patent
Cosmo et al.

(10) Patent No.: US 12,532,043 B2
(45) Date of Patent: *Jan. 20, 2026

(54) SYSTEMS, METHODS, AND APPARATUSES FOR BUFFER MANAGEMENT

(71) Applicant: Comcast Cable Communications, LLC, Philadelphia, PA (US)

(72) Inventors: Jose Romsil Lacang Cosmo, Seattle, WA (US); Robert Smith, Seattle, WA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 15 days.

This patent is subject to a terminal disclaimer.

(21) Appl. No.: 18/600,246

(22) Filed: Mar. 8, 2024

(65) Prior Publication Data

US 2024/0406487 A1    Dec. 5, 2024

Related U.S. Application Data

(63) Continuation of application No. 17/566,341, filed on Dec. 30, 2021, now Pat. No. 11,968,417.

(51) Int. Cl.
*H04N 21/43* (2011.01)
*H04N 21/439* (2011.01)
*H04N 21/44* (2011.01)
*H04N 21/81* (2011.01)

(52) U.S. Cl.
CPC ... *H04N 21/43078* (2020.08); *H04N 21/4392* (2013.01); *H04N 21/44004* (2013.01); *H04N 21/812* (2013.01)

(58) Field of Classification Search
None
See application file for complete search history.

(56) References Cited

U.S. PATENT DOCUMENTS

| | | | |
|---|---|---|---|
| 5,754,774 A | 5/1998 | Bittinger et al. |
| 5,859,971 A | 1/1999 | Bittinger et al. |
| 5,933,603 A | 8/1999 | Vahalia et al. |
| 6,665,872 B1 | 12/2003 | Krishnamurthy et al. |
| 7,665,115 B2 | 2/2010 | Gallo et al. |
| 10,638,180 B1 | 4/2020 | Pringle et al. |
| 2002/0056123 A1 | 5/2002 | Liwerant et al. |
| 2002/0150126 A1 | 10/2002 | Kovacevic |
| 2005/0166135 A1 | 7/2005 | Burke et al. |
| 2006/0156374 A1 | 7/2006 | Hu et al. |
| 2007/0081562 A1 | 4/2007 | Ma |
| 2009/0276821 A1 | 11/2009 | Amento et al. |

(Continued)

FOREIGN PATENT DOCUMENTS

| | | |
|---|---|---|
| WO | 2006003234 A1 | 1/2006 |
| WO | 2012151983 A1 | 11/2012 |
| WO | 2021169632 A1 | 9/2021 |

*Primary Examiner* — William J Kim
(74) *Attorney, Agent, or Firm* — Ballard Spahr LLP

(57) ABSTRACT

Methods, systems, and apparatuses for content deliver, buffer management and synchronization are described herein. Content being played back on a playback platform is analyzed and based on the analysis, asynchronous playback of the content may be determined. A source buffer flush may be performed to correct the asynchronous playback. After the source buffer flush is performed, content segments may be written to the source buffer so that playback of the content on the playback platform resumes with synchronized audio and video.

24 Claims, 9 Drawing Sheets

(56) References Cited

U.S. PATENT DOCUMENTS

| | | |
|---|---|---|
| 2011/0138414 A1 | 6/2011 | Koren et al. |
| 2012/0207215 A1 | 8/2012 | Ryu et al. |
| 2021/0044845 A1 | 2/2021 | Bertolami et al. |
| 2022/0217194 A1 | 7/2022 | Sodagar |
| 2022/0400297 A1 | 12/2022 | Luft |
| 2023/0052385 A1 | 2/2023 | Shah et al. |

SYSTEMS, METHODS, AND APPARATUSES FOR BUFFER MANAGEMENT

CROSS-REFERENCE TO RELATED APPLICATIONS

This application claims the benefit of U.S. application Ser. No. 17/566,341, filed Dec. 30, 2021, the content of which is incorporated herein by reference in its entirety.

BACKGROUND

Content may be streamed via a playback device as a multiple period content stream. The content may be a content item comprising an audio track and a video track, for example. Some playback platforms (e.g., web browsers) may stream the content item in a way that causes the audio track and the video track to become out of synchronization during playback. For example, a web browser may stream the content item such that audio or video intended to be output during one playback period of the multiple periods is output during a different playback period. For example, during streaming of the content item, a browser source buffer of the web browser may output video content segments that are out of synchronization with audio video segments. Resetting or clearing the browser source buffer may adjust streaming of the content item so that the audio track and video track are no longer out of synchronization. This may improve streaming of the content item. These and other considerations are addressed herein.

SUMMARY

It is to be understood that both the following general description and the following detailed description are exemplary and explanatory only and are not restrictive, as claimed. Methods, systems, and apparatuses for management of content delivery, including buffer management, content insertion and synchronization, are described herein. A content stream (e.g., a transmission of a content item) may be streamed for playback on a playback platform (e.g., an Internet browser, a video player on a device, etc.). For example, the content stream may be a multiple period content stream played back via multiple playback periods. A period may be a duration of time associated with a quantity of content. For example, a period may be 60 seconds having a starting point of zero seconds and an ending point of 59 seconds. A period may include one or more content segments. A multiple period content stream may include multiple periods that are demarcated by a discontinuity. The multiple period content stream may include periods that include advertisements. Playback of the content stream may depend on what type of playback platform is used for playback. During playback of the content stream, two adjacent periods of the multiple playback periods may be appended together and rendered in a way that causes a desynchronization (e.g., a gap) in either the audio or video. Based on what type of playback platform is used, audio of the content stream may become out of synchronization with video of the content stream. For example, a playback platform may cause unsynchronized playback of audio and video of the content stream. In other words, the audio may be started before the applicable video is started, causing the audio to be played before the correct scene or image of the video. Based on a difference between a current playback period and an expected playback period, a need and a time to flush or clear a source buffer of the playback platform may be determined. The source buffer may be flushed at the determined time and new audio content segments and video content segments may be written to the source buffer. The flush and write operation may resolve the unsynchronized audio and video so that playback of the audio and video of the content item is synchronized after the write operation for a particular playback platform.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
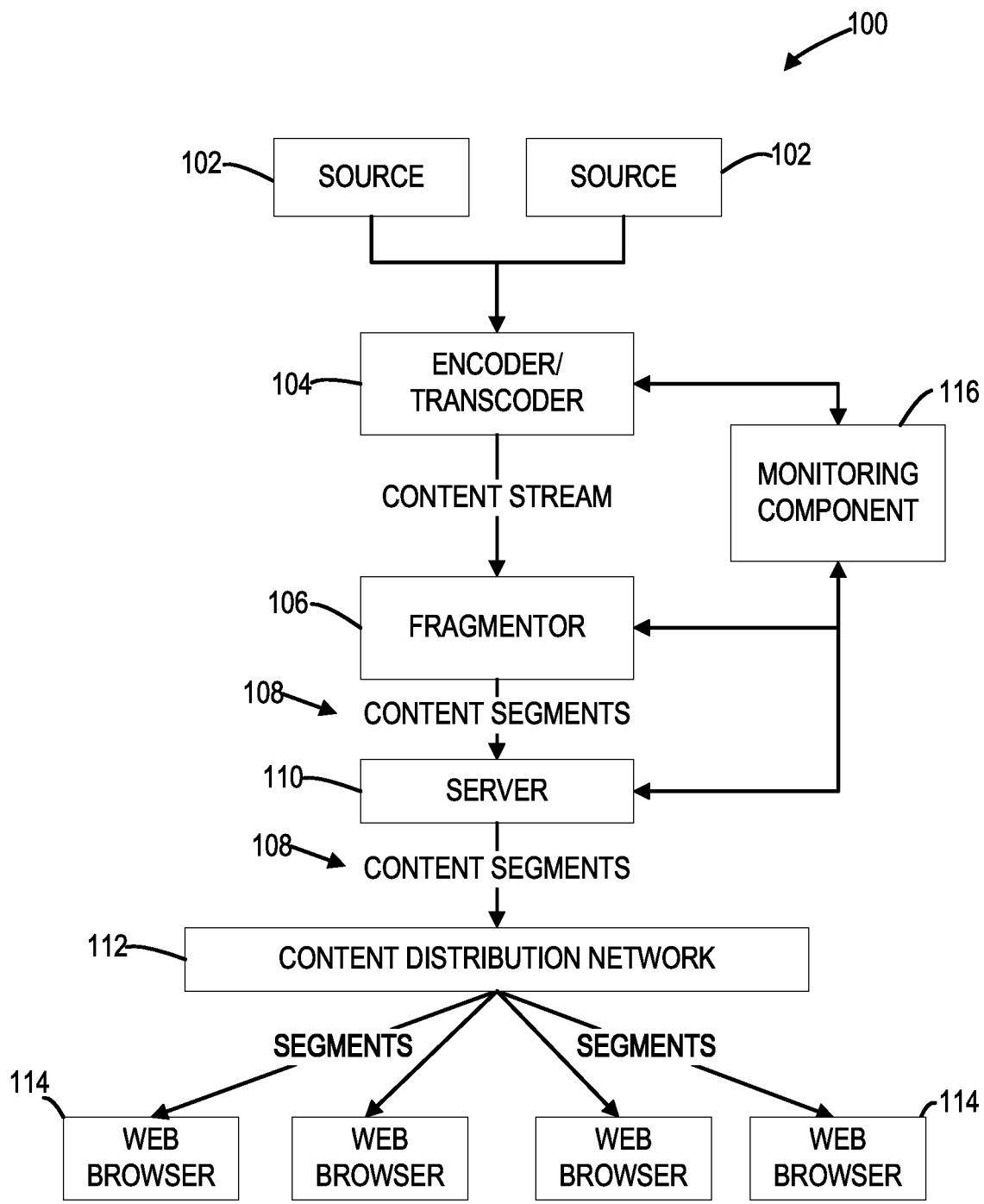
FIG. 1 shows an example environment in which the present methods and systems may operate.

Before the present methods and systems are described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Described are components that may be used to perform the described methods and systems. These and other components are described herein, and it is understood that when combinations, subsets, interactions, groups, etc. of these components are described that while specific reference of each various individual and collective combinations and permutation of these may not be explicitly described, each is specifically contemplated and described herein, for all methods and systems. This applies to all aspects of this application including, but not limited to, steps in described methods. Thus, if there are a variety of additional steps that may be performed it is understood that each of these additional steps may be performed with any specific embodiment or combination of embodiments of the described methods.

The present methods and systems may be understood more readily by reference to the following detailed description and the examples included therein and to the Figures and their previous and following description. As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, flash memory internal or removable, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, may be implemented by special purpose hardware-based computer systems that perform the specified functions or steps, or combinations of special purpose hardware and computer instructions.

FIG. 1 illustrates various aspects of an example environment in which the present methods and systems can operate. The environment is relevant to systems and methods for buffer management for content (e.g., streaming content items). Those skilled in the art will appreciate that present methods may be used in systems that employ both digital and analog equipment. One skilled in the art will appreciate that provided herein is a functional description and that the respective functions can be performed by software, hardware, or a combination of software and hardware. FIG. 1 comprises an example data stream fragmentation network and system 100. The network and system 100 may comprise one or more data sources 102 in signal communication with an encoder 104. For example, the one or more data sources 102 may comprise a data feed, signal source, file source, content provider, and/or the like. For example, the one or more data sources 102 may be an Internet-based content services platform, a streaming content service, a content store, a computing device application, and/or the like. The content originating from the one or more data sources 102 may be audio content, video content, news feed, sports programming, and/or the like. The content may be provided to various playback platforms for streaming consumption. For example, the playback platform may be an Internet browser on a computer, a web-based application on a smartphone, a video player of an application on an Internet connected device (e.g., tablet, mobile phone, etc.), an Internet of Things (IOT) device, and/or the like.

A playback platform may be a particular type of playback platform. A type of playback platform may refer to a type of web browser (e.g., Internet Explorer®, Edge, Mozilla Firefox®, Google Chrome®, Safari®), a type of mobile application (e.g., Sling TV, YouTube, ESPN), a smart TV or output device capable of streaming content (e.g., Roku, Google Chromecast, Android TV, Apple TV, Amazon Fire), and/or the like. The content being played back on the playback platform may be a live streaming content item, a Video on Demand content item, and/or a saved content item. The playback of content may include playback breaks in the content during streaming. For example, the playback breaks may be included in the content to insert or to splice in advertisements into the content. The breaks may be considered a discontinuity and may be signaled by a period tag, discontinuity tag, or otherwise.

The advertisement insertion may be client side advertisement insertion or server side advertisement insertion. The streamed content may include the playback periods. Content segments or advertisement segments may be output during the playback periods. The playback platform may correspond to asynchronous streaming, such as when an audio track (e.g., audio adaptation set) of the content is output in an unsynchronized matter relative to a video track (e.g., video adaptation set) of the content. For example, a portion of the audio track or video track may be output in an incorrect playback period. The audio track may comprise audio segments and span the entirety of the audio for the content being played back, for example. The video track may comprise video segments span the entirety of the video for the content, for example. As an example, the audio track, video track, or a portion thereof may be output in a different playback period than the playback period during which the portion should have been output. As an example, an audio segment (e.g., audio content segment, audio advertisement segment) or a video segment (e.g., video content segment, video advertisement segment) may be erroneously output during playback of the content. For example, during a playback period, an audio advertisement segment may be erroneously output simultaneously with a video content segment because of desynchronization between the segments. That is, the audio advertisement segment may be erroneously output instead of accurate output of an audio content segment during the playback period. This may cause the video track and audio track to be out of synchronization (sync) during playback by the playback platform.

A monitoring component 116 may monitor and/or analyze one or more data streams such as content streams, multiple playback period content streams, multi-bit rate adaptive transport stream multicasts within a channel grouping, and/or the like. The monitoring component 116 may parse through the Moving Pictures Experts Group (MPEG) header information to identify and verify that the signaling structure of the data streams is properly formatted within applicable MPEG packets. For example, the monitoring component 116 may comprise a storage medium for monitoring and/or analyzing the data streams. As an example, the monitoring component 116 may determine a type of the playback platform, such as a type of recovery mechanism associated with the playback platform. For example, the monitoring component 116 may determine the presence of a gap in audio track relative to the video track resulting from execution of the recovery mechanism. For example, the type of recovery mechanism may cause the gap. For example, the type of recovery mechanism may cause the playback platform to output audio segments from one playback period during another playback period. The determined type of the playback platform may be used by a playback controller, such as a playback controller of one or more of the web browsers 114, to correct playback. For example, the playback controller may manage a source buffer of the playback platform to correct the out of sync audio and video.

As an example, the one or more data sources 102 may be configured to transmit the content (e.g., as a content stream) to various end-users (e.g., or allow access to the content stream). As an example, the one or more data sources 102 may be a network data feed transmitting the content stream to subscribers or clients. As an example, the one or more data sources 102 may transmit or allow access to the content stream in a standard video format, such as, but not limited to, any of the MPEG standards (e.g., MPEG-2, MPEG-4, a single MPEG-4 video encapsulated in an MPEG-2 transport stream over UDP MCAST, etc.), or any of the standards for audio and/or video, such as MP3, Quicktime, and Audio Video Interleave (avi). For example, the content stream may be a multiple period content stream. For example, the content stream may comprise a plurality of content segments that may each comprise a plurality of frames of content. The content segments may be grouped together to form a larger content stream. The multiple periods of the content stream may refer to a playback period (e.g., indicated by a period tag) in Dynamic Adaptive Streaming over HTTP (DASH) streaming or a discontinuity in HTTP Live Streaming (HLS) (e.g., indicated by a EXT-X-DISCONTINUITY tag). For example, the playback period may be defined within a stream of audio segments and video segments that may be played back sequentially (e.g., back to back). For example, the playback period may define a discontinuity relative to an adjacent playback period such that the audio segments and video segments at the end of one playback period may not be smoothly played back sequentially with the audio segments and video segments the beginning of the next playback period.

The one or more data sources 102 may comprise a manifest controller configured to manage one or more manifest files for the content. For example, the one or more manifest files may comprise metadata specifying information pertaining to various files of the content such as a name, data size, bit rate of the various files. The one or more manifest files may comprise timing signals. For example, the timing signals may describe the location of various content segments (e.g., audio segments, video segments) within the content stream. The content stream may be provided from the one or more data sources 102 in the standard video format to an encoder 104. However, the encoder 104 can receive the data stream from any source having any format that can be encoded (or transcoded) into a format that is appropriate for streaming. The encoder 104 can be any device, system, apparatus, or the like to encode and/or transcode the content stream. For example, the encoder 104 may convert input video having a single bit rate (e.g., high bit rate video), to an output video of one or more content streams of other bit rates (e.g., lower bit rate video). For example, the content stream may be an adaptive bit rate streaming (ABR) content stream. As an example, the encoder 104 may convert the content stream from the input format received from the data source (such as MPEG-4) to a transport format for distribution to users or consumers (such as MPEG-2). As an example, the encoder 104 may convert the content stream from the input format to a format suitable for streaming on a playback platform such as the web browsers 114. As an example, the encoder 104 may add information to the content stream, such as a playback break (e.g., advertisement insertion point), a playback period, and/or the like. For example, at the advertisement insertion point, an advertisement from a server 110 (e.g., advertisement server, distribution server) may be received via the monitoring component 116 for insertion of advertisements. For example, advertisement segments (e.g., video advertisement segment, audio advertisement segment) may be inserted after a playback period (e.g., containing content segments) of the content stream ends.

The encoder 104 may comprise a device such as a transcoder that conditions streaming data and/or changes data from one format to another. For example, the encoder 104 may comprise a separate encoder and transcoder for conditioning streaming content and/or changing the content from one format to another. As an example, the encoder 104 may receive or access the content stream from an input and encode/transcode information onto the content stream. As an example, the encoder 104 may add information to the content stream relating to content segments 108 (e.g., content fragments, audio segment, video segment, content segment, advertisement segment, etc.). The information may relate to the audio track or the video track of the content stream, such as a boundary point for writing different one or more audio segments and/or one or more video segments to the source buffer of the playback platform, for example. The information may relate to a plurality of playback periods of the content stream. For example, the encoder 104 may encode the content stream with information indicative of a signaling point and/or a signaling structure of at least one of the content segments 108 in the content stream. The signaling structure may be a Group of Pictures (GOP) structure including a plurality of pre-defined frames. As an example, any of the frames may be configured by the encoder 104 to define at least one signaling point for each of the content segments 108. For example, frames of one or more content segments may be encoded with entries to indicate at least one of: a time stamp, a segment duration, an identification of a signaling point, a frame type, an identification of a signaling structure, and/or the like.

The content stream may comprise content that may be divided into one or more content segments 108. As an example, each content segment of the content segments 108 may comprise a particular bit rate and resolution. For example, the content stream may be an adaptive data stream and each of the content segments 108 may comprise variable characteristics such as bit rate and resolution. The content stream may comprise a plurality of playback periods such that when the content stream is ready for playback by a playback platform, audio segments and video segments are output by the playback platform according to each playback period of the plurality of playback periods, for example. Accordingly, the audio segments and video segments for the content stream may be organized into the plurality of playback periods depending on a type of the playback platform being used. The audio segments and video segments for the one or more playback periods may constitute the audio track and video track, respectively, for the content stream.

The content segments 108 may be defined by one or more signaling points (e.g., boundaries, switching points, etc.) as described above and a pre-defined time duration. The content segments 108 may comprise one or more frames having a frame type (e.g., I, IDP, P, B, etc.). As an example, one or more signaling points may be an indicated point in a video format appropriate for streaming that may be assignable to a video frame independent of a signal structure (e.g., GOP structure, of the data stream. For example, a content segment 108 containing high-speed action may include a large number of frames, but need not be limited to a single GOP, which enables an appropriate amount of video information to be encoded into the fragment for smooth output without removing information that was present in the original data stream received from the one or more data sources 102. Furthermore, each content segment 108 of the content segments 108 formed from the data stream may have different characteristics such as duration, resolution, bit rate, and/or the like.

The encoder 104 may encode the data stream with a Coordinated Universal Time (CUT) or Universal Time Coordinated (UTC) stamp that is indicative of a time the encoder 104 conditions the content stream. As an example, the time stamp may be indicative of a time that a boundary flag is encoded in the data stream. For example, the boundary flag may indicate a demarcation point between two adjacent playback periods. For example, the boundary flag may indicate a playback period (e.g., playback break) at which the content stream switches from output of a content item to an advertisement or vice versa. CUT/UTC may be a time standard based upon the international atomic clock and can be relied upon by various computer networks, the Internet, and in aviation to coordinate time between systems across the world. Other standard time system and universal time systems can be used. The encoder 104 may encode the added information in a data field (e.g., private field, header, metadata, and the like) associated with the content stream. For example, information bits may be placed in a private data field (e.g., AU_Information, PVR assist field, private filed, and the like) of an adaptation field of the MPEG transport stream. (See SCTE128, international standard ISO/IEC 13818-1, and DVB 101-154, each of which is hereby incorporated herein by reference in its entirety.)

The use of a field such as the adaptation field may be beneficial to system performance because the information bits may be part of a video packet and precede the video data, where it is not necessary to look further into the video data to discover the encoded information. As an example, the random_access_indicator field in a conventional MPEG-2 adaptation_field may typically indicate that the current data packet contains some information to aid random access. Accordingly, the access indicator field may be used by the encoder 104 to indicate that information relating to at least the identification and marking of content segments 108 are included in the content stream. However, the information may be encoded in any data structure associated with the content such that a device receiving the content will also receive the information and will be able to use the information to analyze, parse, and/or fragment the content. For example, the MPEG-4 standard includes a supplemental enhancement information (SEI) level that would provide space for encoding the information bits into the stream. In particular, an SEI message may be created and placed at every location within the content stream. However, the information may be inserted by the encoder 104 into other fields, headers, and the like, or can be placed in separate files associated with the content.

The content stream may be encoded with a plurality of bits that are subsequently accessible by downstream devices such as a fragmentor 106 when parsing the data stream. The fragmentor 106 may be in signal communication with the encoder 104, such as in order to receive the content stream. The fragmentor 106 may receive a conditioned version of the content stream and construct the appropriate content segments 108 (e.g., content fragments) for distribution to an end user. The fragmentor 106 may separate the content stream into content segments 108 for downstream processing of the content. For example, the fragmentor 106 may separate or fragment the content stream into each of the content segments 108 represented by the content stream based upon information encoded onto the data stream by the encoder 104, such as a determining a quantity of playback period for organization of the content segments 108. As an example, the fragmentor 106 may access the information encoded/inserted in the content stream by the encoder 104 to define the content fragments 108 based on boundaries, switching, timing, duration, and/or the like from the encoded content stream. The fragmentor 106 may send the content segments 108 to the server 110, which may distribute the content segments 108 to the corresponding end users. The fragmentor 106 may output the one or more manifest files to the server 110. For example, the one or more manifest files may be used to determine the quantity of playback periods in the content stream. For example, the one or more manifest files output by the fragmentor 106 may be used by the server 110 to determine which segments of the content segments 108 are included in a particular playback period of the playback periods. As an example, the fragmentor 106 may use timing signals of the one or more manifest files and/or timing information embedded content segments 108 to determine which segments are included in the particular playback period. The server 110 (e.g., advertisement server) may also insert advertisements into the content stream and/or distribution network at specific points. For example, the advertisements may be retrieved by the server 110 from a database.

The fragmentor 106 may condition the content stream for downstream distribution by a computing device such as the server 110 through a content distribution network 22 to user devices or consumer devices, such as devices executing corresponding web browsers 114. For example, the server 110 may be an origin server (e.g., Hypertext Transfer Protocol (HTTP)). The server 110 may control distribution of the content segments to the web browsers 114. The web browsers 114 may each comprise a playback controller for communicating with the manifest controller of the or more data sources 102 and for controlling writing of content segments 108 (e.g, media segments) to the source buffer of the web browsers 114 or another type of playback platform. However, other computing devices and servers may be used. As an example, the fragmentor 106 may communicate with the server 110 using the POST method of the Hypertext Transfer Protocol (HTTP). However, other protocols and communication methods can be used. For example, provider-supplied and/or user-supplied devices may be disposed downstream of the content distribution network 112 and upstream of one or more user devices running the web browsers 114. As an example, the provider-supplied and/or user-supplied devices may be configured to process the content segments 108 such as via de-fragmenting, for example.

For example, when the content segments 108 are generated by the fragmentor 106, the content segments 108 may be sent to the content distribution network (CDN) 102 for delivery to the user devices or clients for playback, such as the web browsers 114. As an example, a media writer of the CDN 102 may send and/or write the content segments 108 to a playback platform, such as writing the content segments 108 for storage by the source buffer of the playback platform. As an example, the server 20, CDN 22, and the user device 24 can intercommunicate using the GET method of the HTTP. However, other protocols and communication methods can be used. The server 110 may provide the processed segments to the web browsers 114. The processed segments may include one or more audio content segments and one or more video content segments. If playback of the audio content segments or the video content segments becomes unsynchronized with respect to the other, the playback controller of the web browsers 114 may initiate a buffer flush of the source buffer. The network and/or system 100 may include other components such as processors, routers, network devices and the like. In an embodiment, the server can determine playback is out of sync or desynchronized with the monitoring component 116. The web browsers 114 may also perform the functions of the monitoring component 116. For example, the web browsers 114 can perform the function of monitoring component by determining that tracks, segments, points, or periods are out of sync. In such a circumstance, the web browser 114 may clear the data from a source buffer of the desynchronized web browser 114, which can result in pulling data from an intermediate buffer to populate the source buffer. The web browser 114 can then continue media playback from the source buffer.

Figure 2:
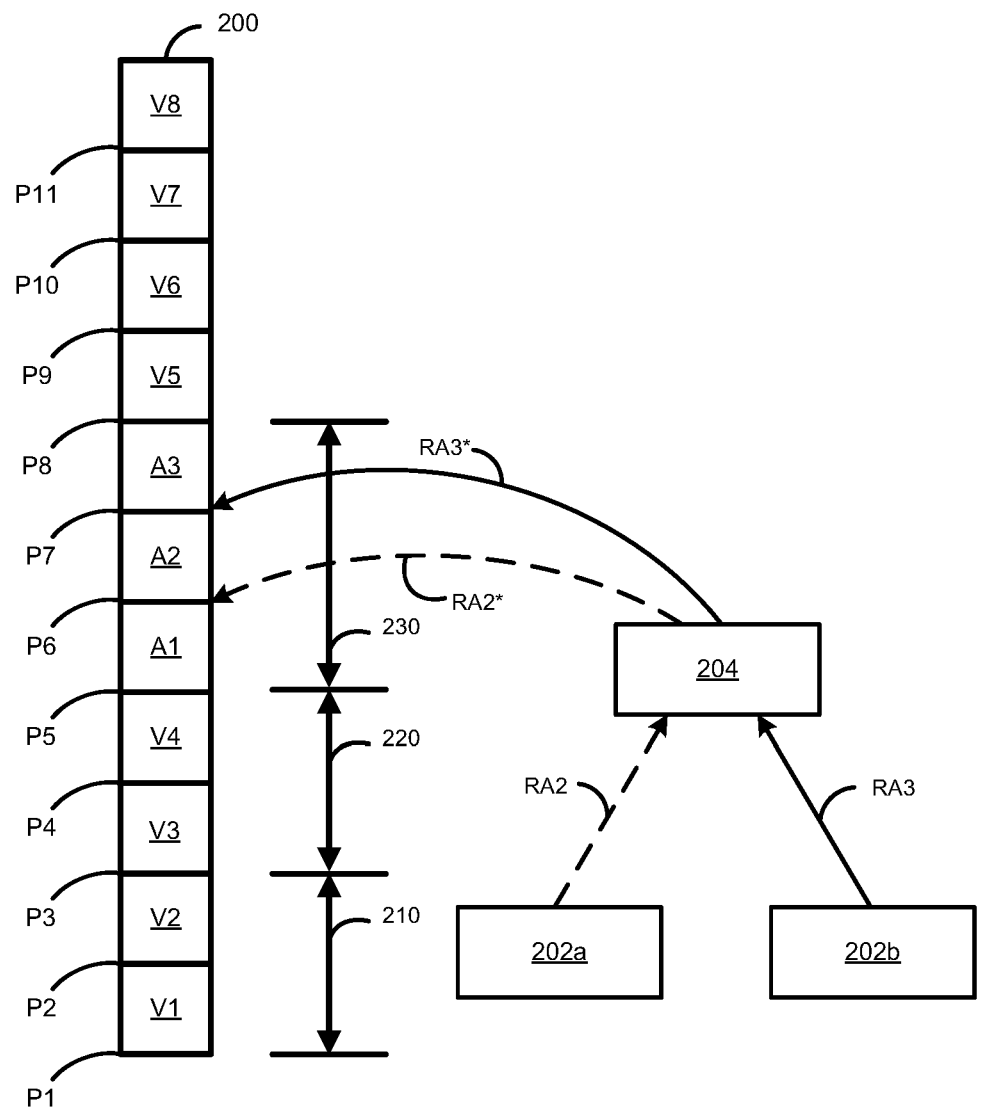
FIG. 2 shows an example environment in which the present methods and systems may operate.

FIG. 2 illustrates various aspects of an example environment in which the present methods and systems can operate. The environment is relevant to systems and methods for buffer management for content (e.g., streaming content items). Those skilled in the art will appreciate that present methods may be used in systems that employ both digital and analog equipment. One skilled in the art will appreciate that provided herein is a functional description and that the respective functions can be performed by software, hardware, or a combination of software and hardware. FIG. 2 illustrates a block representation of a process for directing/redirecting playback platforms (e.g., content players on a web browser 114) to a segment(s) (e.g., content segment 108 such as an advertisement segment) of an advertisement in a content stream 200. For example, the server 110 may perform a process for redirecting playback platforms from a content item (e.g., audio content segment, video content segment) of the content stream 200 to an initial segment (e.g., audio advertisement segment, video advertisement segment) of an advertisement in the content stream 200. As an example, the advertisement may be inserted into the content stream 200 during a playback break. For example, the advertisement may be spliced into the content stream. For example, a majority of the playback periods for the content stream 200 may be used to output a movie content item and a minority of the playback periods (e.g., playback breaks) may be used to output the advertisement.

The advertisement may be inserted at a signaling point (e.g., playback break demarcation point) or boundary of an audio content segment or video content segments of a content item (e.g., movie content item) such that after output of an audio advertisement segment and/or video advertisement segment of an advertisement ends, the content stream 200 returns or restarts output of the content item at the point of the content item occurring before the signaling point. Playback platforms may insert advertisements via client side advertisement insertion or server side advertisement insertion, for example. In client side advertisement insertion, a playback platform client may wait for a playback period of an existing playback period timeline specified by the manifest file to end before inserting the advertisement. In this way, the end of the existing playback period may function as the signaling point for insertion of the advertisement. In server side advertisement insertion, a remote advertisement server (e.g., server 110) may modify the manifest file for the content stream 200 and insert separate playback periods for playback of the inserted advertisements, for example. The advertisement may be stored in an intermediate buffer of a content provider so that if a source buffer of a playback platform is flushed (e.g., reset, cleared, purged, overwritten), the advertisement may be inserted or written to the source buffer immediately after the source buffer is flushed. This may prevent a lag time from occurring after the source buffer is flushed.

For example, upon determining audio (e.g., audio track) and video (e.g., video track) of the content stream 200 is out of sync, a playback controller may cause the source buffer to be flushed so that media segments cleared out of the source buffer are replaced by audio segments (e.g., audio content segment, audio advertisement segment) and video segments (e.g., video content segment, video advertisement segment) stored in the intermediate buffer. The content stream 200 (e.g., video stream) may be provided by a content source (e.g., the one or more sources 102). The content stream 200 may comprise content segments (e.g., audio segments, video segments, text segments) that are fragments of the content stream or an advertisement being inserted into the content stream. The content segments may be collections of information. Each content segment may correspond to a single file that is listed in an index file (e.g., manifest file) containing resource locations (e.g., URLs) of different files that comprise the content stream 200. Combined together, the content segments may make up the content stream 200. For example, segments of video may make up a whole video. The content stream 200 may be sent to a playback platform 202a (e.g., content player, media device, mobile device) and/or a playback platform 202b (e.g., content player, media device, mobile device) as, or in a form comprising, an index file, a multimedia file, a text file, a code, a script, metadata, a resource location(s), combinations thereof, and/or the like.

As an example, providing and/or making available the content stream 200 may comprise associating the content stream 200 with resource locations. The playback platform 202a and the playback platform 202b may each be a different type, brand, web browser type, equipment type and/or the like. For example, the playback platform 202a may be a type of web browser (e.g., Internet Explorer®, Edge, Mozilla Firefox®, Google Chrome®, Safari®) operated on a first user device (e.g., laptop, tablet, mobile phone, etc.) while the playback platform 202b may be a different type of web browser operated on a second user device. For example, the playback platform 202a may be associated with a first type of output device such as a Roku, a Google Chromecast, an Android TV, an Apple TV, an Amazon Fire device, a type of set top box, and/or the like and the playback platform 202b may be associated with a second type of output device. The playback platform 202a and the playback platform 202b may each send requests such as RA2, RA3 for the content stream 200 based on the type of playback platform, the associated playback periods, and/or the type of content stream 200. The requests RA2, RA3 for the content stream 200 may comprise requests sent to a redirect device 204 in order to initiate receipt of a content item or an advertisement of the content stream 200, for example. In response to the requests RA2, RA3, a media writer may write media segments to the corresponding source buffers of the playback platform 202a and the playback platform 202b.

The redirect device 204 may determine whether the playback platform 202a or the playback platform 202b should be directed to a content segment of the content item or a content segment of the advertisement of the content stream 200. For example, the content stream 200 may comprise a plurality of content segments (V1, V2, V3, V4, A1, A2, A3, V5, V6, V7, V8). Some or all of the content segments may comprise advertisements (e.g., A1, A2, A3 can be segments of video of an advertisement). Some or all of the content segments may comprise video segments (e.g., V1, V2, V3, V4, V5, V6, V7, V8 can be content segments of video of a football game or show, etc.). The content segments, regardless of whether they are advertisement content or content item content, may include audio segments and/or video segments. One or more content segments may precede the content segments V1, V2, V3, V4, A1, A2, A3, V5, V6, V7, V8 and one or more content segments can follow the content segments V1, V2, V3, V4, A1, A2, A3, V5, V6, V7, V8. As an example, the content segments (V1, V2, V3, V4, A1, A2, A3, V5, V6, V7, V8) can be associated with different points (P1, P2, P3, P4, P5, P6, P7, P8, P9, P10, P11) of the content stream 200. Points (P1, P2, P3, P4, P5, P6, P7, P8, P9, P10, P11) may demarcate where content segments (V1, V2, V3, V4, A1, A2, A3, V5, V6, V7, V8) or periods 210, 220 begin or end. For example, points (P1, P2, P3, P4, P5, P6, P7, P8, P9, P10, P11) may be period tags or discontinuity tags. As an example, the content segments (V1, V2, V3, V4, A1, A2, A3, V5, V6, V7, V8) can be associated with different playback periods 210, 220, 230 of the content stream 200. For example, the different points may demarcate various playback periods 210, 220 of the content stream 200. The playback periods 210, 220, 230 may include one or more content segment (V1, V2, V3, V4, A1, A2, A3, V5, V6, V7, V8). For example, the playback periods 210, 220, 230 may correspond to boundaries where segments at the end of one of the playback periods 210, 220, 230 cannot be smoothly played back to back with segments of the next period (e.g., the playback period 210 is associated with V1, V2, V3, V4 while playback period 220 is associated with A1, A2, A3). The playback platform 202a or playback platform 202b may use a quantity of playback periods specified by one or more manifest files associated with the content stream 200 for determining the demarcated playback periods.

The playback periods 210, 220, 230 may be associated with a runtime/duration of the content stream 200. For example, the playback period 210 may include the content segments V1, V2 at the start of the content stream 200, the playback period 220 may correspond to the content segments V3, V4 at a 2-second runtime/duration of the content stream 200, the playback period 230 may correspond to the content segments A1, A2 at a 4-second run-time/duration of the content stream 200. The content segments (V1, V2, V3, V4, A1, A2, A3, V5, V6, V7, V8) may include audio segments and/or video segments of the content item of the content stream 200 rather than any advertisement content. Each audio content segment and/or video content segment of the content segments (V1, V2, V3, V4, A1, A2, A3, V5, V6, V7, V8) may be included within one of the different playback periods 210, 220, 230. The content segments (V1, V2, V3, V4, A1, A2, A3, V5, V6, V7, V8) and/or the different playback periods 210, 220, 230 may be associated with resource locations.

Each playback period may comprise tracks, such as an audio track, video track, text track (e.g., closed captioning text track), and/or the like. During a particular playback period such as 210, content segments such as V1, V2 may comprise an audio segment and/or video segment that may become out of sync. For example, the audio segment/audio track and/or video segment/video track may be of different lengths. For example, when the playback platform 202a appends the audio track and video track for each playback period of the content stream 200 together, a gap may occur. In this situation, based on the type of the playback platform 202a and the associated recovery mechanism being used, adjacent audio segments may be condensed in playback such that an audio content segment or a video content segment or portion thereof originally intended to be output during a first playback period (e.g., 210) is instead inadvertently output for playback during a different playback period (e.g., 220). This situation may result in the audio and video of the content stream 200 becoming out of sync. A playback controller may correct this out of sync, desynced, situation by determining a time to flush the source browser of the playback platform 202a, flushing the source browser, and/or causing new audio segments and/or video segments to be written to the source buffer. For example, upon receiving the requests RA2, RA3 to initiate receipt of the content stream 200 starting at the playback point P6 (RA2) and at the playback point P7 (RA3) for the playback platform 202a and/or the playback platform 202b, the playback controller may determine that audio content segments from the content item originally intended for content segment V8 are instead being played back at during content segment V7. For example, an audio advertisement segment A1 may be intended to be output starting at playback point P7 instead of audio content segment V5. For example, a video advertisement segment A1 may be intended to be started at playback point P7 instead of video content segment V5. The request may be for points or periods.

Accordingly, the playback controller may compare a current playback time to an expected playback time to determine the correct audio segments to write to the source buffer after playback point P7 ends and playback point P8 begins. For example, the playback controller may use the comparison and/or the one or more manifest files to determine that segment A3 should be output after playback point P8 begins. Segment A3 may include an audio advertisement segment and/or video advertisement segment, for example. As an example, the playback controller may determine an end point of a playback break such as the end of segment A3 of the advertisement of the content stream 200 for determining when to perform the buffer flush of the source buffer. If the audio and video of a requested playback period are synchronized, then the playback controller may allow delivery of the content stream 200 according to the request RA2, RA3. For example, the redirect device 204 may receive the requests RA2, RA3 for the content stream 200 from the playback platform 202a and the playback platform 202b. The requests RA2, RA3 for the content stream 200 may comprise requests associated with specific playback points (e.g., P5, P6, P7, etc.) or one or more periods (e.g., 210) in the content stream 200. As an example, the playback platform 202a may send the request RA2 to the redirect device 204 requesting the content stream 200 at the playback point P6 which corresponds to the segment A2 (e.g., audio advertisement segment, video advertisement segment). The playback platform 202b may send the request RA3 to the redirect device 204 requesting the content stream 200 at the playback point P7 which corresponds to the segment A3. Requests may be for periods or points (e.g., P1, 210

The redirect device 204, based on a determination that the request RA2 is an initial request for the content stream 200, may redirect the request RA2 as a request RA2* to the playback point P5 which corresponds to an initial segment A1 of the advertisement despite the playback platform 202a having requested playback point P6 in the content stream 200. The redirect device 204, based on the determination that the request RA3 is the initial request for the content stream 200, may redirect the request RA3 as a request RA3* to the playback point P5 which corresponds to the initial segment A1 of the advertisement of the content stream 200 despite the playback platform 202b having requested playback point P7 in the content stream 200. The redirect device 204 may determine requests RA2, RA3 are initial requests based on the requests RA2, RA3 comprising session IDs.

For example, the session IDs may be parameters of the requests RA2, RA3 when the requests RA2, RA3 are sent as HTTP queries (e.g., HTTP GET). The session IDs may be associated with the corresponding playback platform 202a and playback platform 202b. For example, the session IDs may be associated based on corresponding device identifiers of the playback platform 202a and the playback platform 202b. For example, the redirect device 204 may access a lookup table comprising session ID information to determine that session IDs are associated with the requests RA2, RA3. The redirect device 204 may determine that the requests RA2, RA3 are not initial requests. For example, based on the determination that the request RA2 is not the initial request for the content stream 200, the redirect device 204 may direct the request RA2 as a request RA2* to the playback point P6 as requested by the playback platform 202a. For example, the redirect device 204, based on the determination that the request RA3 is not the initial request for the content stream 200, may direct the request RA3 as a request RA3* to the playback point P7 as requested by the playback platform 202b.

Figure 3:
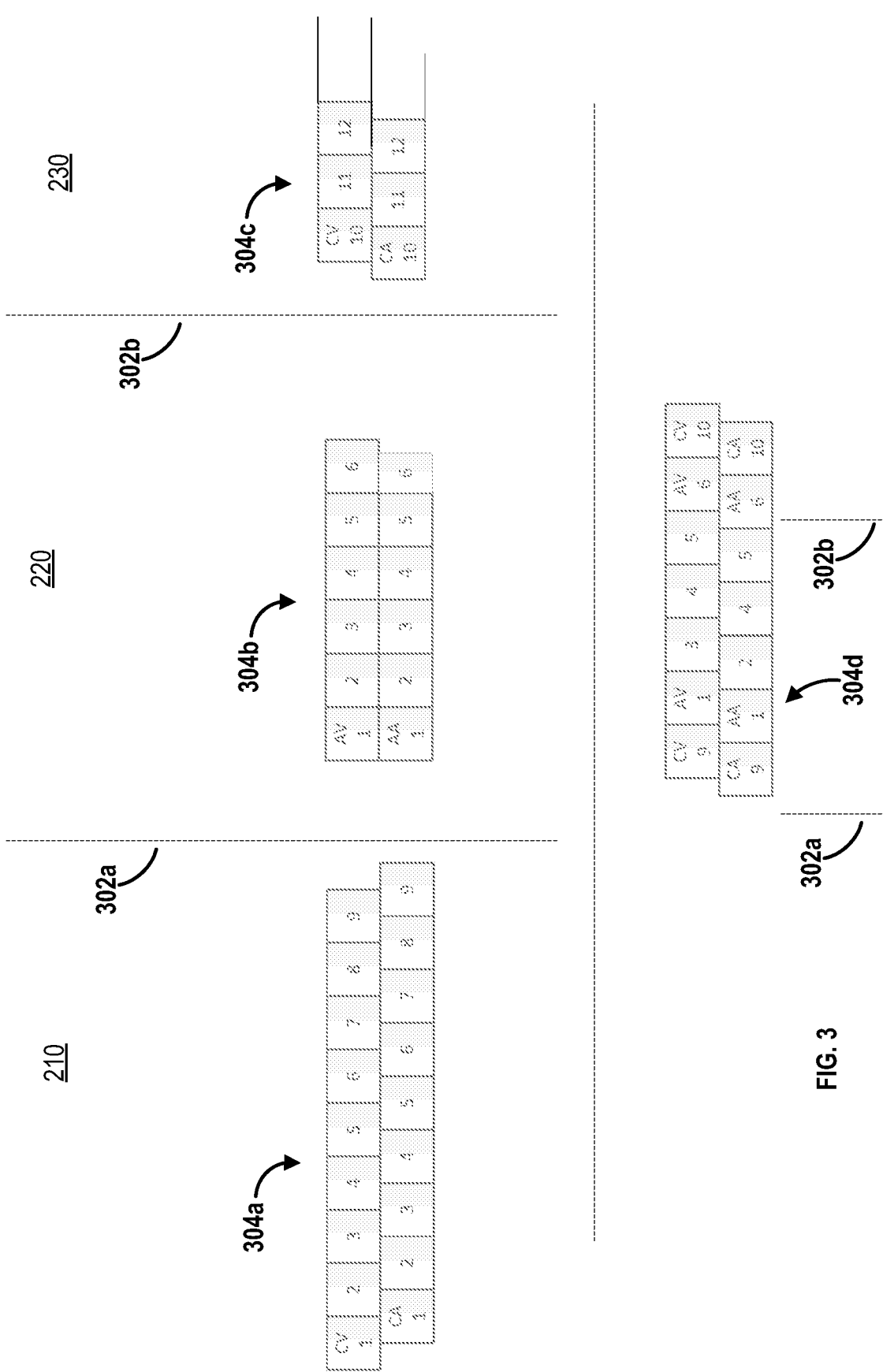
FIG. 3 shows an example multiple period content stream.

FIG. 3 shows an example multiple period content stream. Those skilled in the art will appreciate that the multiple period content stream may be used in conjunction with systems that employ both digital and analog equipment. One skilled in the art will appreciate that provided herein is a functional description and that the respective functions can be performed by software, hardware, or a combination of software and hardware. The multiple period content stream may be delivered to a playback platform over three playback points P1, P2, P3 or one or more periods (e.g., 210, 220, 230). The three playback points P1, P2, P3 or one or more periods (e.g., 210, 220, 230) may be demarcated based on playback point boundaries 302a, 302b. A playback period may be a portion of the multiple period content stream defined by a start time and a duration of the playback period. The multiple period content stream may include segments, such as content segments, audio segments, video segments, and/or text segments. The segments may be organized by playback periods of the multiple period content stream. For example, the segments may be organized into three playback points P1, P2, P3 or one or more periods (e.g., 210, 220, 230). Less or additional playback periods may be used to segment the multiple period content stream. For example, subset of the segments may be loaded for each playback period of the multiple period content stream for output of content by the playback platform.

A quantity of the playback periods of the multiple period content stream may be determined based on or defined by a manifest file associated with the multiple period content stream. For example, the manifest file may comprise timing signals to indicate a location and/or order of the segments. As an example, a fragmentor (e.g., fragmentor 106) may use the timing signals to determine the quantity and identity of the playback, such as the three playback points P1, P2, P3 or one or more periods (e.g., 210, 220, 230). For example, the quantity of the playback periods may be based on a type of playback platform being used for playback. For example, a content item of the multiple period content stream may be output in the playback point P1, one or more advertisements may be output in the playback point P2, and output of the content item may resume in the playback point P3 or one or more periods (e.g., 210, 220, 230). The content item may be a movie, television show, streaming sports program, and/or the like. The fragmentor may also use timing information embedded in the segments to determine the quantity and identity of the playback periods. The fragmentor may determine which segments of the multiple period content stream should be included in a particular period of the playback periods. For example, the fragmentor may determine which segments of the content stream should be output by the playback platform according to playback point P1 or one or more periods (e.g., 210, 220, 230), such as the segments of the content section 304a. For example, the fragmentor may determine which segments of the content stream should be output by the playback platform according to playback point P2 or one or more periods (e.g., 210, 220, 230), such as the segments of the content section 304b. For example, the fragmentor may determine which segments of the content stream should be output by the playback platform according to playback point P3 or one or more periods (e.g., 210, 220, 230), such as the segments of the content section 304c.

The combination of the content section 304a, content section 304b, and content section 304c may form the multiple period content stream. The content section 304a of playback point P1 or one or more periods (e.g., 210, 220, 230) may be separated from the content section 304b of the playback point P2 or one or more periods (e.g., 210, 220, 230) based on a playback period boundary 302a. A boundary may be a discontinuity in playback. The discontinuity may be demarcated by a period tag or discontinuity tag. For example, boundaries 302a, 302b may indicate periods 210, 230 non-continuous content that breaks at boundary 302a, 302b for an advertisement during period 220. The content section 304b of the playback point P2 or one or more periods (e.g., 210, 220, 230) may be separated from content section 304c of playback point P3 or one or more periods (e.g., 210, 220, 230) based on a playback period boundary 302b. The combination of the audio segments of the content section 304a, the content section 304b, and the content section 304c may form an audio track (e.g., adaption set of a DASH manifest file) of the multiple period content stream. The combination of video segments of the content section 304a, the content section 304b, and the content section 304c may form an video track (e.g., adaption set of a DASH manifest file) of the multiple period content stream. The audio track and the video track may indexed by playback period, such as indexed by the playback points P1, P2, P3 or one or more periods (e.g., 210, 220, 230). Other tracks such as a text track and/or the like may be provided.

A segment layout as depicted by the content section 304a, content section 304b, and content section 304c may indicate a correct order of playback of the segments by the playback platform according to the manifest file. Each content section may include audio segments and video segments. For example, the content section 304a may include nine audio segments numbered from one to nine and nine video segments numbered from one to nine. The segments of the content section 304a may be from the content item of the multiple period content stream. For example, the content section 304b may include nine audio segments numbered from one to six and nine video segments numbered from one to six. The segments of the content section 304b may be from an advertisement, such as an advertisement spliced into the stream of the content item at various advertisement insertion points. For example, the advertisement may be configured to be inserted at the playback boundary 302a. More than one advertisement may be inserted between output of the content item, such as more than one advertisement (e.g., more than content section 304b) during multiple playback periods (e.g., more than playback point P2 or one or more periods). The content section 304c may include three audio segments numbered from ten to twelve and three video segments numbered from ten to twelve. As an example, the content section 304c may represent the resumption of the multiple period content stream at the playback point P3 or one or more periods (e.g., 210, 220, 230). For example, playback of the content item may be resumed at the playback point P3 or one or more periods (e.g., 210, 220, 230) with the audio content segment "10" and video content segment "10" since audio advertisement segments and video advertisement segments of content section 304b at the playback point P2 or one or more periods (e.g., 210, 220, 230) were inserted after audio content segment "9" and video content segment "9" were output by the playback platform at the end of playback point P1 or one or more periods (e.g., 210, 220, 230).

The type of the playback platform being used for the multiple period content stream may cause the segments from one or more of the content section 304a, the content section 304b, and/or the content section 304c to become inadvertently offset. For example, the audio track/audio segments from any of the content sections may be misaligned with the video track/audio segments from any of the content sections. As an example, a type of recovery mechanism of the type of playback platform may cause the segments being played back by the playback platform to be compressed, which may cause a misalignment between audio and video. For example, video content segment "1" may occur earlier than audio content segment "1" during playback. For example, at playback boundary 302a, audio content segment "9" and video content segment "9" may be misaligned when the playback point P2 or one or more periods (e.g., 210, 220, 230) begins. As an example, as illustrated by content section 304d the advertisement may be configured to start when the playback point P2 or one or more periods (e.g., 210, 220, 230) begins at the playback boundary 302a, but the audio content segment "9" and video content segment "9" may be erroneously output instead of audio advertisement segment "1" and video advertisement segment "1". That is, the type of recovery mechanism associated with the type of playback platform may cause audio content segment "9" and video content segment "9" to be output during playback point P2 or one or more periods (e.g., 210, 220, 230) even though the manifest file prescribes that the audio content segment "9" and video content segment "9" should be output during playback point P1 or one or more periods (e.g., 210, 220, 230).

The type of recovery mechanism associated with the type of playback platform may also cause output of the audio content segment "9" to be misaligned with respect to the video content segment "9." This misalignment may cause the audio and the video of the multiple period content stream to appear mismatched to a user of the playback platform during playback. For example, segments of the content section 304d may be conflated at the playback boundary 302a such that the playback point P2 or one or more periods (e.g., 210, 220, 230) may begin with misaligned audio and video, such as no video being output while the audio content segment "9" is output by the playback platform. That is, the segments of or one or more periods (e.g., 210, 220, 230) or playback points P1 and P2 may be appended together such that a gap occurs during playback. This gap may result in the audio content segment "9" being output earlier than the video content segment "9" and being incorrectly output in playback point P2 or one or more periods (e.g., 210, 220, 230) although the audio content segment "9" was intended to be output in playback point P1 or one or more periods (e.g., 210, 220, 230). This gap may result in the audio advertisement segment "1" and video advertisement segment "1" being output later during playback point P2 or one or more periods (e.g., 210, 220, 230) that prescribed by the manifest file.

The segments of the content section 304d may be conflated at the playback boundary 302b. As an example, the audio advertisement segment "6" and video advertisement segment "6" may be incorrectly output in playback point P3 or one or more periods (e.g., 210, 220, 230) despite being prescribed for playback in playback point P2 or one or more periods (e.g., 210, 220, 230) by the manifest file. For example, a portion of the audio advertisement segment "6" may be output in playback point P2 or one or more periods (e.g., 210, 220, 230) while another portion of the audio advertisement segment "6" may be output in playback point P3 or one or more periods (e.g., 210, 220, 230). The audio advertisement segment "6" and video advertisement segment "6" may be misaligned based on the gap caused by the type of recovery mechanism. As an example, the audio advertisement segment "6" may be output earlier than the video advertisement segment "6" even though output of the audio advertisement segment "6" and video advertisement segment "6" should be aligned and start simultaneously. As an example, the audio content segment "10" and video content segment "10" may be erroneously output in playback point P2 or one or more periods (e.g., 210, 220, 230) even though the manifest file specifies that the audio content segment "10" and video content segment "10" should be output in playback point P3 or one or more periods (e.g., 210, 220, 230) after the playback boundary 302b is crossed.

As such, the type of playback platform may cause playback to be out of sync, such as based on the audio of the multiple period content stream being unsynchronized with respect to the video of the multiple period content stream. For example, a particular audio segment, a particular video segment, or a portion thereof may be output in another playback period relative to the playback period in which the particular segment was originally intended to be output.

Figure 4:
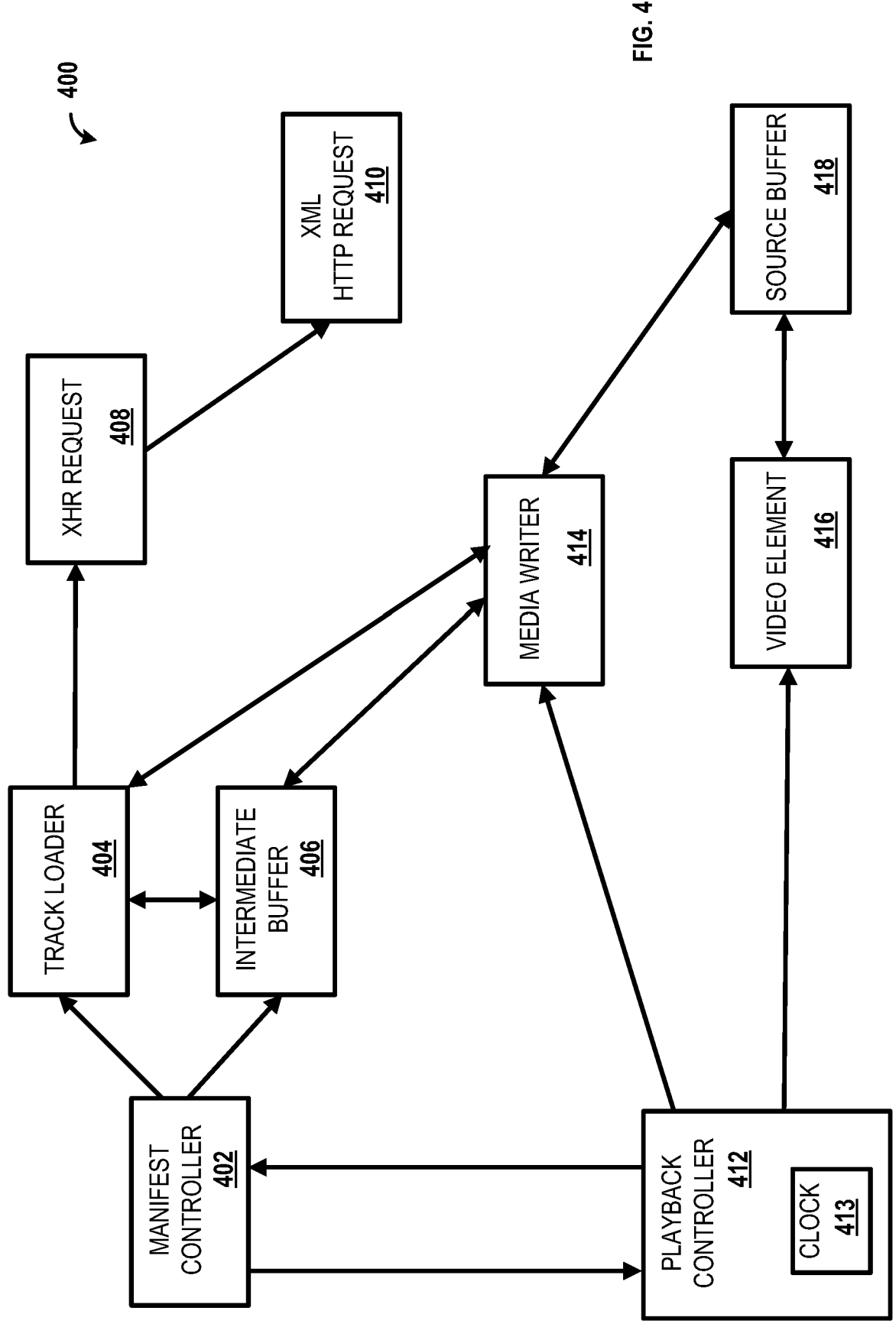
FIG. 4 shows an example environment in which the present methods and systems may operate.

A playback controller may be configured to correct the out of sync playback. For example, the playback controller may manage a source buffer of the playback platform to correct the out of sync audio segments and/or video segments. As an example, upon determining that the playback is out of sync, the playback controller may cause a source buffer of the playback platform to be flushed (e.g., reset, cleared, purged, overwritten) to remove segments stored within the source buffer. This way, different (e.g., new unplayed segments of the multiple period content stream) segments may be written to the source buffer. The different segments may be synchronized segments of the content item or the advertisement of the multiple period content stream. For example, after the flush of the source buffer, the audio advertisement segment "1" and video advertisement segment "1" may be output at the start of a new playback period. For example, after the flush of the source buffer, the audio content segment "10" and video content segment "10" may be output at the start of the new playback period. Other segments of the multiple period content stream may be output after the source buffer flush. The synchronized segments being output after the source buffer flush may be retrieved by the playback platform from an intermediate buffer so that output may continue smoothly after the source buffer flush. For example, the synchronized segments may be retrieved from storage in the intermediate buffer and immediately written to the source buffer for output without any undesired lag time. FIG. 4 illustrates various aspects of an example operating environment 400 in which the present methods and systems can operate. The environment 400 is relevant to systems and methods for buffer management for content (e.g., streaming content items). Those skilled in the art will appreciate that present methods may be used in systems that employ both digital and analog equipment. One skilled in the art will appreciate that provided herein is a functional description and that the respective functions can be performed by software, hardware, or a combination of software and hardware. The environment 400 comprises a manifest controller 402 to control playback of content such as a content stream (e.g., content stream 200). The manifest controller 402 may receive a manifest file associated with the content being played back. The manifest file may comprise information, such as metadata indicative of or associated with the content files constituting the content, such as name, version, bit rate, playback period, and/or the like. The manifest file may indicate a number of playback periods and/or playback breaks for a type of playback platform that the content is being played back on. The number of playback periods and/or playback breaks may be different depending on the type of playback platform. The type of playback platform may refer to a type of web browser (e.g., Internet Explorer®, Edge, Mozilla Firefox®, Google Chrome®, Safari®), a type of mobile application (e.g., Sling TV, YouTube, ESPN), a smart TV or output device capable of streaming content (e.g, Roku, Google Chromecast, Android TV, Apple TV, Amazon Fire), and/or the like.

The manifest controller 402 may be in communication with a track loader 404 for loading an audio track and video track of the content. For example, the content may be a multiple period content stream in which audio content segments and video content segments are loaded for each period of the multiple periods. The track loader 404 may be programmed to load each content segment (e.g., content segment 108) of the content. As an example, the track loader 404 may load content segments (e.g., audio content segments and video content segments) to an intermediate buffer 406. As an example, the track loader 404 may load content segments directly to a playback platform, such as via writing the content segments to a source buffer of the playback platform. For loading each content segment, the manifest controller 402 may execute a loadInitialization function with respect to the parameter HeaderMetadata. For example, executing the loadInitialization(HeaderMetadata) may cause initialization of loading the one or more content segments identified by the specified header metadata and/or the metadata identified by the specified header metadata to start. As an example, the one or more content segments may be the audio content segments and video content segments for a specified playback period. For example, the loadInitialization(HeaderMetadata) may set the identified one or more content segments to their initial state and begin the process of selecting a media source (e.g., the one or more sources 102) and loading the media in preparation for playback, via the playback platform, to begin at a beginning playback period.

The manifest controller 402 may execute a loadMedia function with respect to the parameter SegmentMediaMetadata. For example, executing the load_Media(SegmentMediaMetadata) may cause the segment identified by the specified header metadata to be loaded. Executing of the functions by the manifest controller 402 may cause the track loader 404 to receive the audio track and video track of the content. As an example, the interaction between the track loader 404 and the manifest controller 402 may enable the track loader 404 to determine and/or load audio content segments and video content segments for each playback period of the content. The track loader 404 may execute a load(options, retry) function which specifies various options for loading the segments (e.g., which playback periods to load) and enables retrying the loading of segments if any loading operations fail. The loaded segments are sent to a XHR request module 408. The XHR request module 408 may be used to facilitate sending and receiving HTTP requests in order to exchange data between the web site and a server (e.g., web server 110). The XHR request module 408 may execute an XMLHTTPRequest 410 to retrieve the desired content segments from the server, for example, so that the playback platform may have the desired content segments for playback. The server may be part of a content delivery network (e.g., CDN 112). For example, the XMLHTTPRequest 410 may cause opening a URL corresponding to the web server and sending an HTTP request.

Based on the XMLHTTPRequest 410, the web server may send the content segments for each playback period of the multiple period content stream to the playback platform (e.g., content player) for playback, for example. As an example, the track loader 404 may receive the audio content segments and video content segments for each playback period and send those segments to a media writer 414. For example, for one or more playback periods, the audio content segments may have a different length that the video content segments. Accordingly, when the track loader 404 sends audio content segments and video content segments for a playback period, there may be a gap in the content segments during playback by the playback platform. Prior to a playback period beginning, the media writer 414 may write the audio content segments and video content segments for the playback period to a source buffer 418 of the playback platform. For example, the playback platform may be a web hosted playback platform such as a media player on a web browser. The source buffer 418 and the XMLHTTPRequest 410 may be HTML5 standard components. The XMLHTTPRequest 410 may enable the playback platform to be updated and the XHR request module 408 to receive new content segments of the multiple period content stream (e.g., from a subsequent playback period) from the web server without stopping playback. The manifest controller 402 may write content segments for each playback period to the media writer 414 via an intermediate buffer 406.

For example, the intermediate buffer 406 facilitate quicker or easier access to certain media segments stored within the intermediate buffer 406. As an example, the intermediate buffer 406 may store segments in advance of when they are required to be written by the media writer 414 to the source buffer 418 of the playback platform. This may advantageously reduce the quantity of time spent on buffering by the playback platform. As an example, during a playback period, the intermediate buffer 406 may store content segments corresponding to one or more subsequent playback periods adjacent to the playback period. For writing content segments to the intermediate buffer 406, the manifest controller 402 may execute a write(trackType, {content, range}) function that defines which content segments to queue. For example, the content segment may be an audio content segment of an audio track type with a specific range defined within the multiple period content stream. For example, the content segment may be an video content segment of an audio track type with a specific range defined within the multiple period content stream.

The manifest controller 402 may execute a percentFull( ) function to determine the current capacity of the intermediate buffer 406. For example, the percentFull( ) function may enable the manifest controller 402 to determine the percentage of the intermediate buffer 406 storage size occupied by segments currently stored in the intermediate buffer 406. The manifest controller 402 may control the timing of content segments being written to the intermediate buffer 406. For example, the manifest controller 402 may asynchronously write content segments into the intermediate buffer 406. For example, the manifest controller 402 may execute a nextPosition(trackType) function to determine a playback period of one or more subsequent audio content segments and/or video content segments. The timing of each playback period relative to the multiple period content stream may be measured in milliseconds. The intermediate buffer 406 may execute a quarantined(Segment) function and a writeRange:endRange function to control which audio content segments and/or video content segments are written to the source buffer 418 via the media writer 414. Content segments which are quarantined may be isolated and retained in the intermediate buffer 406.

Segments identified by the writeRange:endRange function (e.g., from a start range to an end range of the multiple period content stream) may be written to the source buffer 418 via the media writer 414. The manifest controller 402 may determine which data ranges are ready for writing content segments to the source buffer 418 by asynchronously pulling segments from the intermediate buffer 406 to the source buffer 418. If playback of the multiple period content stream becomes unsynchronized such as audio content segments and video content segments for one playback period becoming out of sync with respect to each other, playback on the playback platform may be reset and new content segments may be written from the intermediate buffer 406 to the source buffer 418 of the playback platform after the reset to correct the unsynchronized playback. Based on a current playback condition (e.g., current playback period, current playback time), the media writer 414 may append a plurality of playback periods of the multiple period content stream.

For example, the media writer 414 may append the content segments starting from an initial point such as a 10 second point (e.g., as indicated by a clock 413) of a first playback period to an end of a second playback period. For example, the media writer 414 may execute a setMediaWriteRange(range) function which specifies a range of content segments and/or playback periods to write and/or append. For example, the media writer 414 may execute a dequarantine(range,track) function to remove certain content segments from quarantine status in the intermediate buffer 406. The playback controller 412 may facilitate the operation and control the timing of the manifest controller 402 and the media writer 414. The playback controller 412 may be configured to determine, based on the type of playback platform, a time that segments are written to source buffer 418 and when the source buffer 418 should be flushed. For example, the playback controller 412 may determine a current playback period of the multiple period content stream. As an example, the playback controller 412 may determine the current playback period based on the content and the type of playback platform being used for playback of the content. As an example, the playback controller 412 may determine the expected playback period for the type of playback platform. As an example, the playback controller 412 may receive information indicative of the expected playback period from the manifest controller 402. For example, the manifest controller 402 may check an associated manifest file to determine the expected playback period.

The expected playback period may be indicated by the clock 413, which may generate pulses to synchronize operations across the operating environment 400. Based on the clock 413, the playback controller 412 may send a clock notification to the manifest controller 402 that is indicative of the current playback period and the expected playback period (e.g., a difference between the current playback period and the expected playback period). The playback controller 412 may determine, based on the current playback period and the expected playback period, one or more unsynchronized portions of the multiple period content stream. The one or more unsynchronized portions may occur based on the type of playback platform and the media writer 414 appending a plurality of playback periods of the multiple period content stream. For example, when the media writer 414 appends the plurality of playback periods together, a gap may occur because the audio track and the video track of the multiple period content stream have a different length. A recovery mechanism for the type of playback platform may cause the playback platform to pull the audio content segments or video content segments together such that segments from each side of the gap are played back without any pause. This may result in the one or more unsynchronized portions occurring. The playback controller 412 may be configured to address this unsynchronized playback by determining a time to flush the source buffer 418 of the playback platform and write new segments to the source buffer 418.

The playback controller 412 may receive an indication of the expected playback element, such as an expected playback period of the multiple period content stream. For example, the playback controller 412 may receive a subscribeTick(CB) notification from the manifest controller 402. The subscribeTick(CB) notification may comprise a notification of what content types (e.g., audio content segments, video content segments) are available at the expected playback point/period and any missing segments at the expected playback point/period. The playback controller 412 may analyze the range of the missing segments in the multiple period content stream to determine how the one or more unsynchronized portions are unsynchronized. As an example, the playback controller 412 may determine the one or more unsynchronized portions based on comparing the expected playback period and the current playback period as indicated by the clock 413. For example, the one or more unsynchronized portions may comprise an audio content segment or video content segment associated with a first playback period of the multiple period content stream being played back during occurrence of a second different playback period. The one or more unsynchronized portions may comprise audio or video of an advertisement of the multiple period content stream originally intended to be played back during a particular playback period being played back during a playback period corresponding to a content item of the multiple period content stream, for example.

Based on determining a difference between the expected playback period and the current playback period and/or the one or more unsynchronized portions, the playback controller 412 may determine when and which content segments of the multiple period content stream to send to the media writer 414 for writing to the source buffer 418. For example, the playback controller 412 may execute the setMediaWriteRange(range) function and/or the dequarantine(range, track). Prior to writing the content segments, the playback controller 412 may cause source buffer 418 to be flushed (e.g., having existing segments in the source buffer be cleared, reset, purged, or overwritten). Flushing may be achieved by the media writer 414 executing a remove(start, end) function, for example. Execution of the remove(start, end) function may begin at a starting segment and an ending segment indicated by the playback controller 412 based on the expected playback period and the current playback period. Flushing the segments from the source buffer 418 may reset unsynchronized playback of the multiple period content stream such that playback of the multiple period content stream may restart after the buffer flush with synchronized playback of audio content segments and video content segments.

As an example, the synchronized playback may restart with a subsequent playback period after a playback period determined to have one or more unsynchronized portions. As an example, the synchronized playback may restart after a playback break ends. For example, the playback controller 412 may wait until the current playback period ends and determine an end point of the current playback period for restarting playback with synchronized audio and video after the source buffer 418 flush. In this way, the media writer 414 may write new synchronized audio content segments and video content segments from the next playback period after the current playback period. For example, the playback controller 412 may wait until a playback break for insertion of an advertisement ends and determine an end point of the playback break for restarting playback with synchronized audio and video after the source buffer 418 flush. The timing of the buffer flush, the writing of the new synchronized audio content segments and video content segments, the format of the playback periods and/or playback breaks (e.g., duration, quantity) may depend on the type of playback platform used. For example, a type of recovery mechanism for a type of web browser may be used by the playback controller 412 to determine whether, when, and how the source buffer 418 flush and writing new content segments to the source buffer 418 after the flush should be performed. As an example, the new synchronized audio content segments and video content segments may be stored in the intermediate buffer 406.

The media writer 414 may execute an appendBuffer (ArrayBuffer) function in order to write new synchronized audio content segments and video content segments to the source buffer 418 for restarting playback via the playback platform with synchronized segments. For example, the new synchronized audio content segments and video content segments may be stored in the intermediate buffer 406 to reduce or eliminate any buffering delay associated with restarting playback. The source buffer 418 may execute an onUpdateEnd function to confirm to the media writer 414 that the new segments have been written. The new synchronized audio content segments and video content segments may correspond to an advertisement (e.g. associated with a playback break in the multiple period content stream) or a content item of the multiple period content stream. The playback controller 412 may control rendering the multiple period content stream for playback on the playback platform. For example, the playback controller 412 may execute playback functions such as src, currentTime, buffered, play( ), and/or the like. The playback controller 412 may be in communication with a video element 416 for execution of the playback functions. As an example, the video element 416 may be an HTML5 video element. The playback controller 412 may determine the current playback period or time based on determining a current time attribute of the HTML5 video element 416.

The HTML5 video element 416 may perform HTML rendering of a video component of the multiple period content stream being output on the playback platform. The HTML5 video element 416 may be in communication with the source buffer 418 for playback of the content segments in the source buffer 418 via the playback platform. The source buffer 418 may be flushed and restarted with new audio content segments and video content segments (e.g., corresponding to a different playback break or playback period) depending on the type of playback platform in order to correct unsynchronized playback. The manifest controller 402, the track loader 404, the intermediate buffer 406, the XHR request module 408, the playback controller 412, the clock 413, and the media writer 414 may be part of the web browser. The XMLHTTPRequest 410, the video element 416, and the source buffer 418 may be part of or components of the playback platform. The XMLHTTPRequest 410 and the source buffer 418 may also be HTML5 components, for example.

Figure 5:
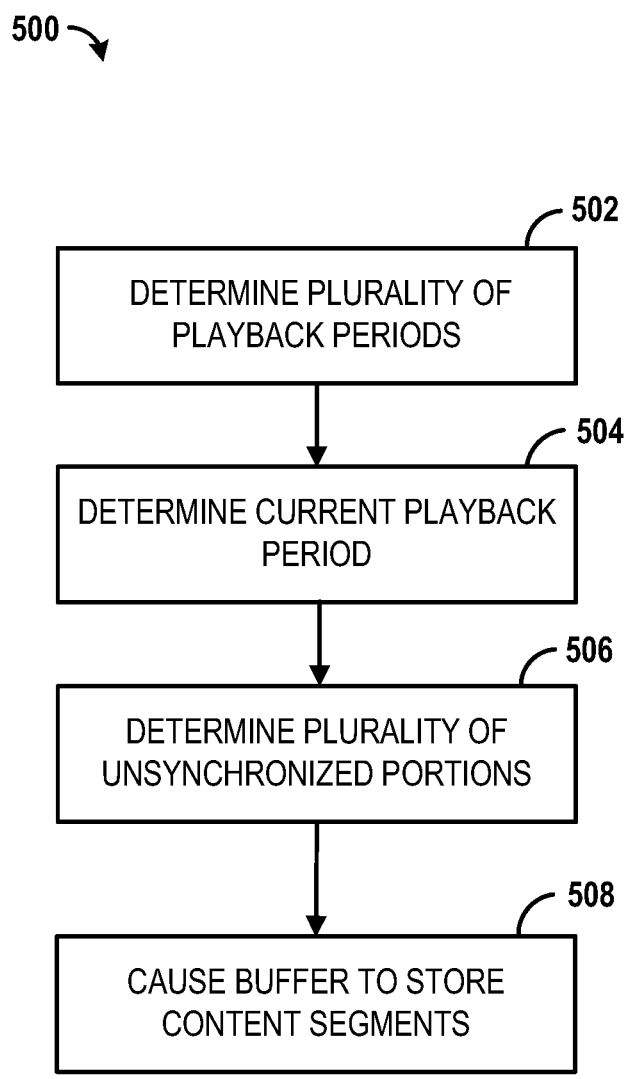
FIG. 5 shows a flowchart of an example method.

FIG. 5 shows a flowchart illustrating an example method 500 for buffer management. The method 500 may be implemented using the devices shown in FIGS. 1-3. For example, the method 500 may be implemented using a device such as the playback controller 412. At step 502, a computing device may determine a plurality of playback periods. For example, the plurality of playback periods may be associated with a content stream. For example, the content stream may be a multiple period content stream comprising the plurality of playback periods. As an example, the computing device may determine the plurality of playback periods to receive the content stream comprising the plurality of playback periods. As an example, the computing device may determine the plurality of playback periods to determine, based on identifying a type of playback platform, a quantity of audio content segments of the content stream and a quantity of video content segments of the content stream. As an example, the computing device may determine the plurality of playback periods to determine a type of playback platform for each playback platform of the plurality of playback platforms and a type of recovery mechanism for each type of playback platform.

At step 504, the computing device may determine a current playback period of the plurality of playback periods. The current playback period may be determined for each playback platform of a plurality of playback platforms. For example, the plurality of playback platforms may comprise at least one of: a plurality of web browsers or a plurality of mobile applications. While waiting for the end of playback, segments may continue to be loaded and queued in such that the segments are available without delay. At step 506, the computing device may determine a plurality of unsynchronized portions of the content stream. The plurality of unsynchronized portions may be determined based on the current playback period and an expected playback period. As an example, the computing device may determine, based on a comparison between the current playback period and the expected playback period, the plurality of unsynchronized portions As an example, the computing device may determine based on identifying information from a manifest file associated with the content stream, the expected playback period. For example, the computing device may determine, based on an audio content segment of the content stream having a duration that differs from a duration of a video content segment of the content stream, a gap in audio for a playback period of the plurality of playback periods.

For example, the computing device may determine based on a quantity of the plurality of periods, playback of an audio content segment associated with a first playback period of the plurality of playback periods during playback of a second playback period of the plurality of playback periods. At step 508, the computing device may cause a buffer to store a plurality of audio content segments and a plurality of video content segments. For example, the buffer may be an intermediate buffer may be caused to store the plurality of audio content segments and a plurality of video content segments based on the plurality of unsynchronized portions of the content stream. The intermediate buffer may be associated with a playback platform of the plurality of playback platforms. As an example, the computing device may cause the intermediate buffer to store the plurality of audio content segments and the plurality of video content segments by storing, by the intermediate buffer and based on a type of the playback platform, the plurality of audio content segments and the plurality of video content segments.

Figure 6:
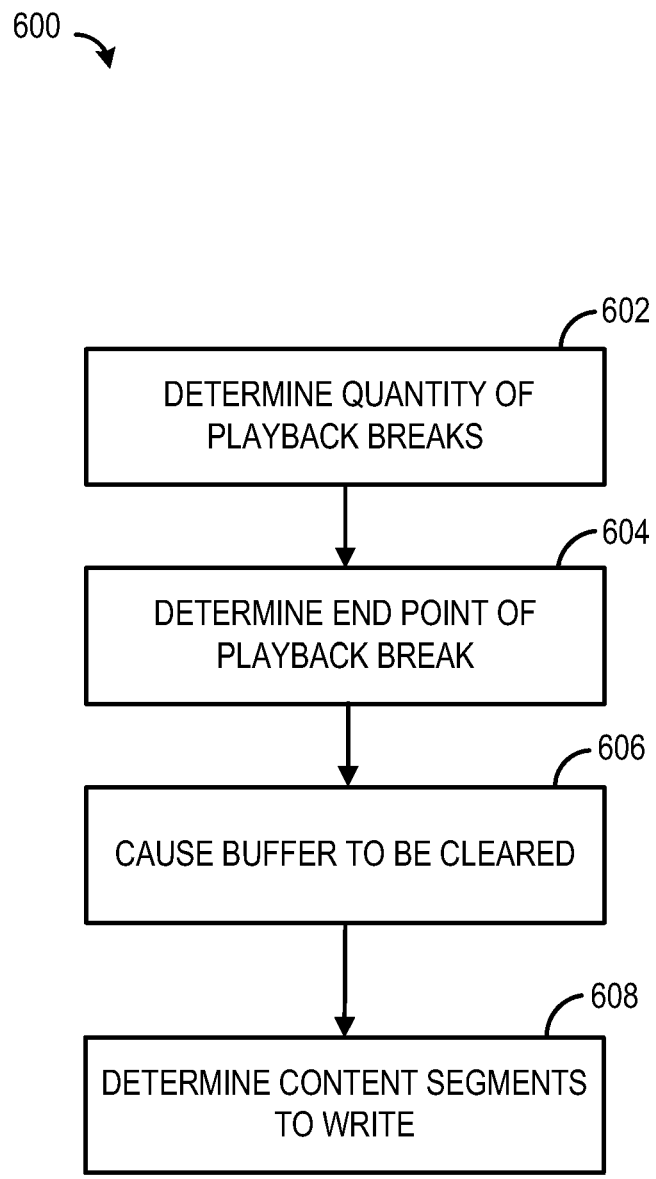
FIG. 6 shows a flowchart of an example method.

FIG. 6 shows a flowchart illustrating an example method 600 for buffer management. The method 600 may be implemented using the devices shown in FIGS. 1-3. For example, the method 600 may be implemented using a device such as the playback controller 412. At step 602, a computing device may determine a quantity of playback breaks of a content stream. The quantity of playback breaks may be for each web browser of a plurality of web browsers. As an example, the computing device may determine the quantity of playback breaks to receive the content stream comprising a plurality of playback periods. As an example, the computing device may determine the quantity of playback breaks to determine a quantity of audio content segments of the content stream and a quantity of video content segments of the content stream. The determination of the quantity of audio content segments of the content stream and a quantity of video content segments of the content stream may be based on identifying a type of the web browser. As an example, the computing device may determine the quantity of playback breaks to determine a type of web browser for each web browser of the plurality of web browsers and a type of recovery mechanism for each type of web browser. The quantity of playback breaks of the content stream may comprise a quantity of advertising breaks.

At step 604, the computing device may determine an end point of a playback break of the plurality of playback breaks. The end point of the playback break may be determined based on a difference between a current playback period and an expected playback period. As an example, the computing device may determine the end point to determine a remaining portion of time from a current playback period to an advertisement insertion end point. For example, while the computing device may wait for the end of the current playback period, new segments may be loaded and queued so that the new segments may be available for retrieval without delay when the current playback period ends. The remaining portion of time from the current playback period to the advertisement insertion end point may be determined based on appending a first period of a plurality of playback periods to a second period of the plurality of playback periods. At step 606, the computing device may cause a buffer of a web browser of the plurality of web browsers to be cleared. For example, the buffer may be a source buffer. The source buffer may be caused to be cleared at the end point. As an example, the computing device may cause the source buffer to be cleared to send content segments stored in the source buffer out of the source buffer.

At step 608, the computing device may determine a plurality of audio content segments and a plurality of video content segments to write to the browser source buffer. The plurality of audio content segments and the plurality of video content segments may be determined based on the source buffer being cleared. As an example, the computing device may determine the plurality of audio content segments and the plurality of video content segments to store the plurality of audio content segments and the plurality of video content segments. The plurality of audio content segments and the plurality of video content segments may be stored by an intermediate buffer and based on a type of the web browser. As an example, the computing device may determine the plurality of audio content segments and the plurality of video content segments to write the plurality of audio content segments and the plurality of video content segments to the source buffer. The computing device may determine playback of an audio content segment associated with an advertisement during a playback period corresponding to the content stream. The determination of the playback of the audio content segment may be based on the quantity of the playback breaks. The content stream may comprise at least one of: a linear content item, a non-linear content item, or a saved content item.

Figure 7:
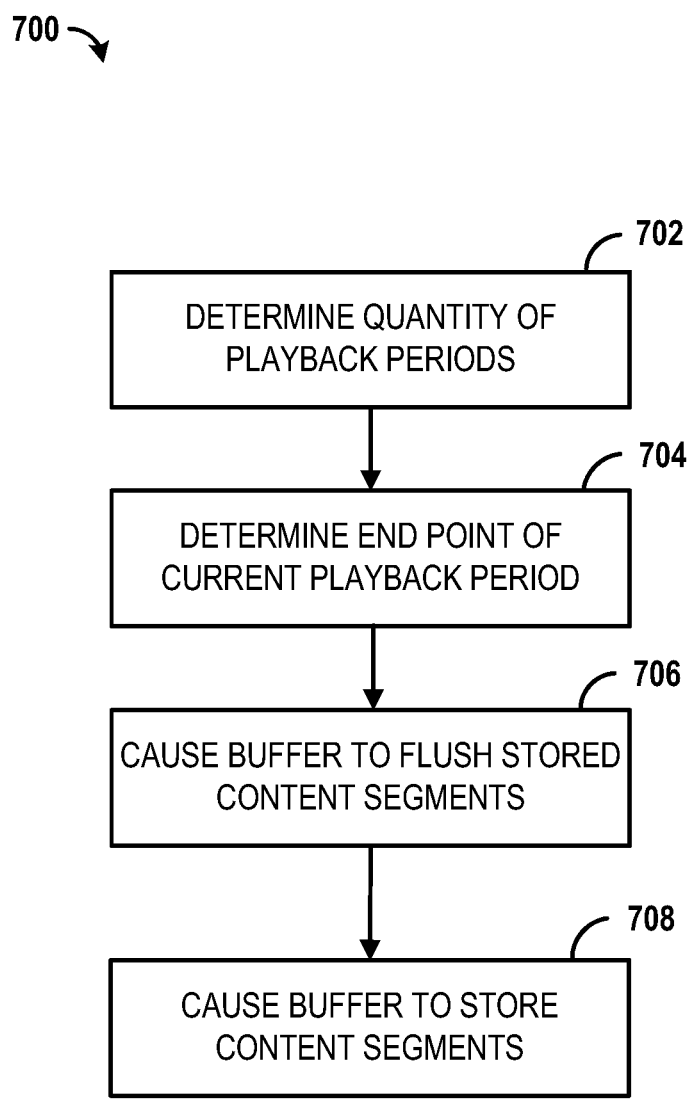
FIG. 7 shows a flowchart of an example method.

FIG. 7 shows a flowchart illustrating an example method 900 for buffer management. The method 900 may be implemented using the devices shown in FIGS. 1, 2, and/or 4. For example, the method 900 may be implemented using a device such as the playback controller 412. At step 702, a computing device may determine a quantity of a plurality of playback periods of a content stream. The quantity of the plurality of playback periods may be determined for each playback platform of a plurality of playback platforms. As an example, the computing device may determine the quantity of the plurality of playback periods to receive the content stream comprising the plurality of playback periods. As an example, the computing device may determine the quantity of the plurality of playback periods to determine quantity of audio content segments of the content stream and a quantity of video content segments of the content stream. The quantity of audio content segments of the content stream and the quantity of video content segments may be determined based on identifying a type of playback platform. For example, the plurality of playback platforms may comprise at least one of: a plurality of web browsers or a plurality of mobile applications.

At step 704, the computing device may determine an end point of a current playback period. The determination of the end point of the current playback period may be based on a difference between a current playback period of the plurality of playback periods and an expected playback period, and based on the quantity of the plurality of playback periods. As an example, the computing device may determine the end point of the current playback period to determine determining a remaining portion of the current playback period until the end point. At step 706, the computing device may cause a buffer of each playback platform of a plurality of playback platforms to deleted a plurality of stored content segments. For example, each playback platform may comprise a source buffer. Each source buffer may be caused to be deleted at the end point. For example, deleting each source buffer may comprise resetting, clearing, purging, or overwriting the content segments in the source buffer.

At step 708, the computing device may cause each source buffer to store a plurality of audio content segments and a plurality of video content segments. As an example, the computing device may cause each source buffer to store the plurality of audio content segments and the plurality of video content segments to store each plurality of audio content segments and each plurality of video content segments. Each plurality of audio content segments and each plurality of video content segments may be stored by an intermediate buffer and based on a type of playback platform. As an example, the computing device may cause each source buffer to write each plurality of audio content segments and each plurality of video content segments. Each plurality of audio content segments and each plurality of video content segments may be written to each source buffer. The computing device may determine, based on the quantity of the plurality of playback periods, playback of an audio content segment associated with a first playback period of the plurality of playback periods during playback of a second playback period of the plurality of playback periods. The computing device may determine the current playback period. The computing device may determine, based on identifying information from a manifest file associated with the content item, the expected playback period.

Figure 8:
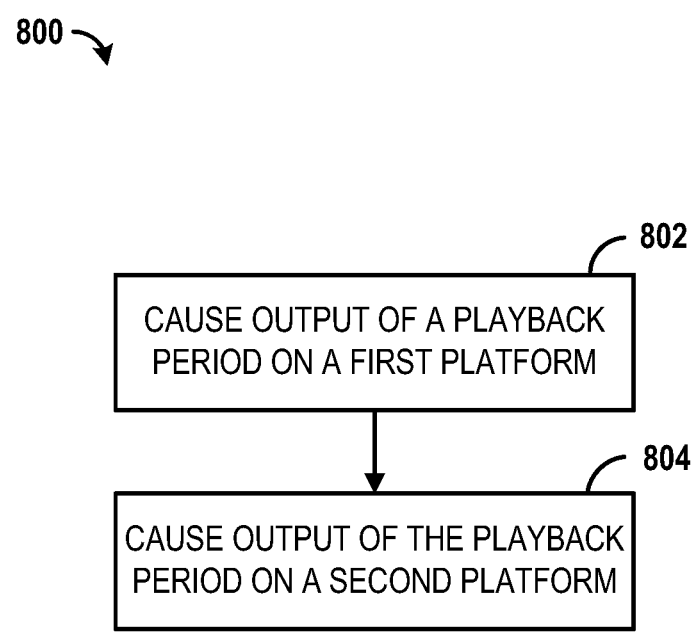
FIG. 8 shows a flowchart of an example method.

FIG. 8 shows a flowchart illustrating an example method 800 for buffer management. The method 800 may be implemented using the devices shown in FIGS. 1-3. For example, the method 800 may be implemented using a device such as the playback controller 412 or monitoring component 116. At step 802, a computing device may cause output of one or more playback periods. The playback periods may be associated with a content stream on a first platform of a plurality of platforms. A content distribution network (e.g., content distribution network 112) may cause such output.

At step 804, the same or another computing device may cause output of one or more playback periods. The playback periods may be associated with a content stream on a second platform of a plurality of platforms. For example, the second platform may be a different type of browser from the first platform. Such a configuration may cause disparate playback of the content stream. For example, the audio segments may be desynchronized from the video segments on the first platform, while rending in sync on the second platform. The first platform, second platform, otherwise or combination thereof may be configured to determine that the audio segments may be desynchronized from the video segments. The determination may be based on a current playback period that is being rendered and an expected playback period defined relative the current playback period. The detection of desynchronization may cause a buffer associated with one or more of the respective platforms to flush a buffer configured to store the audio content segments and the video content segments.

The buffer may be further configured to retrieve synchronized audio content segments and video content segments from an intermediate buffer or otherwise and store the synchronized audio content segments and video content segments for output on one or more of the platforms. The segments may be one or more of the plurality of content segments V1, V2, V3, V4, A1, A2, A3, V5, V6, V7, V8, and some or all of the content segments may comprise advertisements A1, A2, A3. That is, the audio content segment may be an audio portion of content segment V1 or content segment A1. Further, the video content segment may be the corresponding video portion of content segment V1 or content segment A1. The audio content segments and video segments may be a program or an advertisement.

Figure 9:
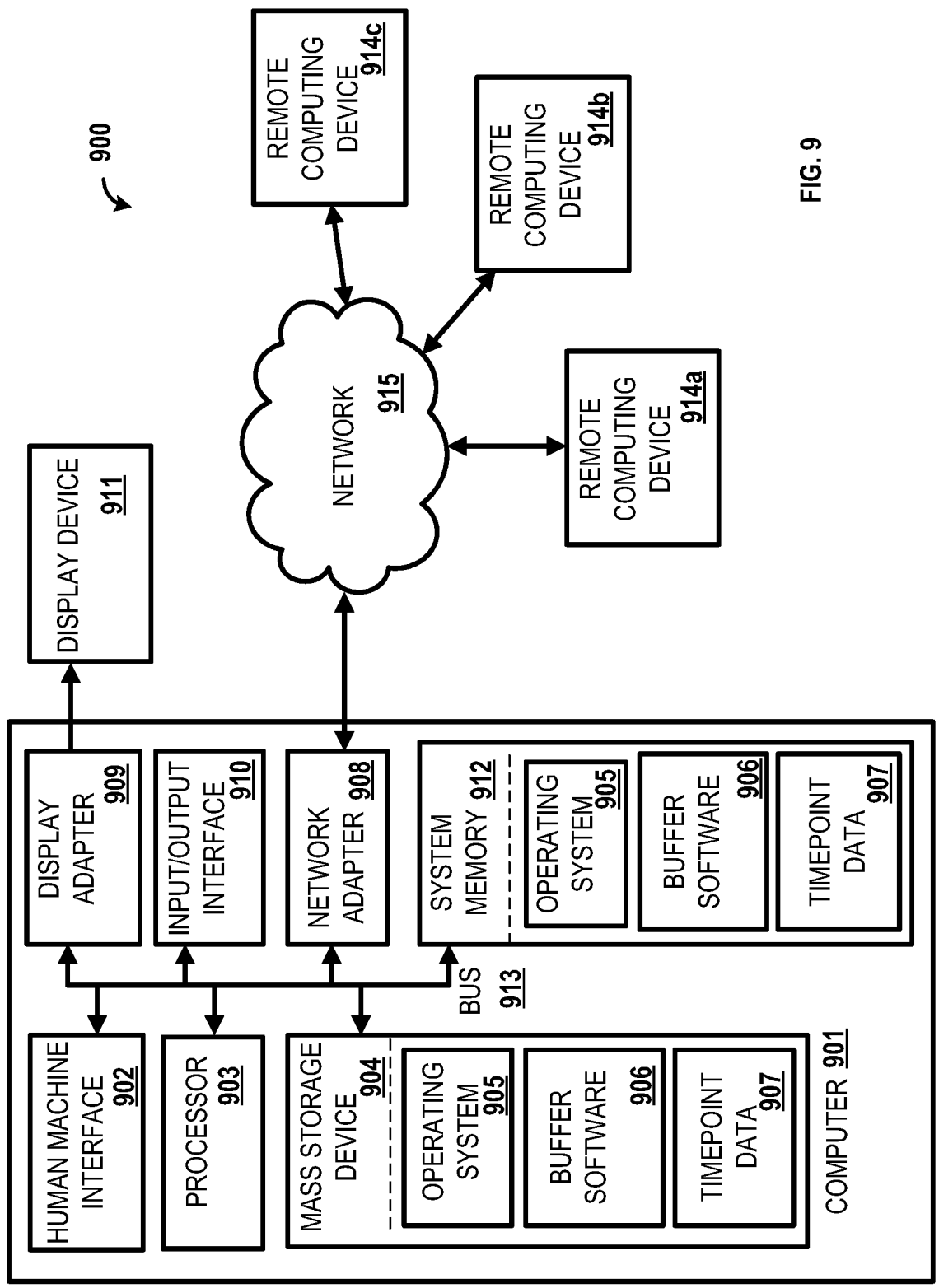
FIG. 9 shows a block diagram of an example computing device in which the present methods and systems may operate.

The methods and systems may be implemented on a computer 901 as illustrated in FIG. 9 and described below. Similarly, the methods and systems disclosed may utilize one or more computers to perform one or more functions in one or more locations. FIG. 9 shows a block diagram illustrating an example operating environment for performing the disclosed methods. This example operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems may be operational with numerous other general purpose or special purpose computing system environments or configurations. Examples of well-known computing systems, environments, and/or configurations that may be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems may be performed by software components. The disclosed systems and methods may be described in the general context of computer-executable instructions, such as program modules, being executed by one or more computers or other devices. Generally, program modules comprise computer code, routines, programs, objects, components, data structures, and/or the like that perform particular tasks or implement particular abstract data types. The disclosed methods may also be practiced in grid-based and distributed computing environments where tasks are performed by remote processing devices that are linked through a communications network. In a distributed computing environment, program modules may be located in local and/or remote computer storage media including memory storage devices.

The network and system 100, the playback platform 202a, the playback platform 202b, the redirect device 204, the playback controller 412, the environment 400, and/or any constituent components of FIGS. 1, 2 and/or 4 may be or include a computer 901 as shown in the block diagram 900 of FIG. 9. The computer 901 may include one or more processors 903, a system memory 912, and a bus 913 that couples various system components including the one or more processors 903 to the system memory 912. In the case of multiple processors 903, the computer 901 may utilize parallel computing. The bus 913 is one or more of several possible types of bus structures, including a memory bus or memory controller, a peripheral bus, an accelerated graphics port, or local bus using any of a variety of bus architectures.

The computer 901 may operate on and/or include a variety of computer readable media (e.g., non-transitory). The readable media may be any available media that is accessible by the computer 901 and may include both volatile and non-volatile media, removable and non-removable media. The system memory 912 has computer readable media in the form of volatile memory, such as random access memory (RAM), and/or non-volatile memory, such as read only memory (ROM). The system memory 912 may store data such as the time point data 907 and/or program modules such as the operating system 905 and the buffer software 906 that are accessible to and/or are operated on by the one or more processors 903.

The computer 901 may also have other removable/non-removable, volatile/non-volatile computer storage media. FIG. 9 shows the mass storage device 904 which may provide non-volatile storage of computer code, computer readable instructions, data structures, program modules, and other data for the computer 901. The mass storage device 904 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and/or the like.

Any quantity of program modules may be stored on the mass storage device 904, such as the operating system 905 and the buffer software 906. Each of the operating system 905 and the buffer software 906 (or some combination thereof) may include elements of the program modules and the buffer software 906. The buffer software 906 may include processor executable instructions that cause the computer 901 to determine asynchronous portions of content being played back on a playback platform. The asynchronous portions may refer to audio content segments being out of sync, for a particular playback period, with respect to video content segments. The buffer software 906 may include processor executable instructions that cause the computer 901 to determine a time to flush a source buffer of the playback platform. The buffer software 906 may include processor executable instructions that cause the computer 901 to cause new content segments to be written to the source buffer after the flush. The new content segments may be written from another buffer (e.g., intermediate buffer 406).

The timepoint data 907 may also be stored on the mass storage device 904. The timepoint data 907 may comprise at least one of: a current playback period, an expected playback period, a comparison between the current playback period and the expected playback period, an end point of a playback period, a playback break, and/or the like. For example, the timepoint data 907 may be based on one or more points (e.g., P1, P2, P3, P4, P5, P6, P7, P8, P9, P10, P11) or a comparison or difference in elapsed time between the one or more points. The points may be specifically related to or based on the audio content segments, video content segments, audio content playback periods, video content playback periods, or combinations thereof. The timepoint data 907 may be based on one or more boundaries (e.g., boundary 302a, 302b, 302c) or a comparison or difference in elapsed time between the one or more boundaries. The boundaries may be specifically related to or based on the audio content segments, video content segments, audio content playback periods, video content playback periods, or combinations thereof.

The timepoint data 907 may be based on playback periods (e.g., playback periods 210, 220, 230). For example, the start time and end time of the playback period, a comparison or difference between the start time and end time of corresponding periods (e.g., one or more audio content segment and one or more video content segment), otherwise, or combinations thereof. The timepoint data 907 may be related to content segments (e.g., V1, V2, V3, V4, A1, A2, A3, V5, V6, V7, V8). For example, the start time and end time of the content segment, a comparison or difference between the start time and end time of corresponding content segments (e.g., one or more audio content segment and one or more video content segment), otherwise, or combinations thereof.

The timepoint data 907 may be used by a computing device (e.g., playback controller 412, manifest controller 402) to control flushing the source buffer and writing the new content segments to the source buffer, such as by determining the timing of the flush and writing operations. The timepoint data 907 may be stored in any of one or more databases (e.g., database 220) known in the art. Such databases may be DB2®, Microsoft® Access, Microsoft® SQL Server, Oracle®, MySQL, PostgreSQL, and the like. The databases may be centralized or distributed across locations within the network 915.

A user may enter commands and information into the computer 901 via an input device (not shown). Examples of such input devices include, but are not limited to, a keyboard, pointing device (e.g., a computer mouse, remote control), a microphone, a joystick, a scanner, tactile input devices such as gloves, and other body coverings, motion sensor, and the like. These and other input devices may be connected to the one or more processors 903 via a human machine interface 902 that is coupled to the bus 913, but may be connected by other interface and bus structures, such as a parallel port, game port, an IEEE 1394 Port (also known as a Firewire port), a serial port, network adapter 908, and/or a universal serial bus (USB).

The display device 911 may also be connected to the bus 913 via an interface, such as the display adapter 909. It is contemplated that the computer 901 may include more than one display adapter 909 and the computer 901 may include more than one display device 911. The display device 911 may be a monitor, an LCD (Liquid Crystal Display), light emitting diode (LED) display, television, smart lens, smart glass, and/or a projector. In addition to the display device 911, other output peripheral devices may be components such as speakers (not shown) and a printer (not shown) which may be connected to the computer 901 via the Input/Output Interface 910. Any step and/or result of the methods may be output (or caused to be output) in any form to an output device. Such output may be any form of visual representation, including, but not limited to, textual, graphical, animation, audio, tactile, and the like. The display device 911 and computer 901 may be part of one device, or separate devices.

The computer 901 may operate in a networked environment using logical connections to one or more remote computing devices 914a, 914b, 914c. A remote computing device may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device, and so on. Logical connections between the computer 901 and a remote computing device 914a, 914b, 914c may be made via a network 915, such as a local area network (LAN) and/or a general wide area network (WAN). Such network connections may be through the network adapter 908. The network adapter 908 may be implemented in both wired and wireless environments. Such networking environments are conventional and commonplace in dwellings, offices, enterprise-wide computer networks, intranets, and the Internet.

Application programs and other executable program components such as the operating system 905 are shown herein as discrete blocks, although it is recognized that such programs and components reside at various times in different storage components of the computing device 901, and are executed by the one or more processors 903 of the computer. An implementation of the buffer software 906 may be stored on or sent across some form of computer readable media. Any of the described methods may be performed by processor-executable instructions embodied on computer readable media.

For purposes of illustration, application programs and other executable program components such as the operating system 905 are illustrated herein as discrete blocks, although it is recognized that such programs and components may reside at various times in different storage components of the computing device 901, and are executed by the one or more processors 903 of the computer 901. An implementation of buffer software 906 may be stored on or transmitted across some form of computer readable media. Any of the disclosed methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" may comprise volatile and nonvolatile, removable and non-removable media implemented in any methods or technology for storage of information such as computer readable instructions, data structures, program modules, or other data. Exemplary computer storage media may comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

The computing device may be configured to send the content stream. The computing device may be configured to determine a quantity of audio content segments of the content stream and a quantity of video content segments of the content stream. A type of playback platform for each of the playback platforms may be determined, and recovery mechanisms may be determined based on the respective types. For example, each platform may have a different threshold for determining when content segments are out of sync. A first platform type may have a higher threshold (e.g., extent of desynch) respective a second platform type.

While the methods and systems have been described in connection with specific examples, it is not intended that the scope be limited to the particular embodiments set forth, as the embodiments herein are intended in all respects to be illustrative rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations may be made without departing from the scope or spirit. Other embodiments will be apparent to those skilled in the art from consideration of the specification and practice described herein. It is intended that the specification and examples be considered as exemplary only, with a true scope and spirit being indicated by the following claims.

The invention claimed is:

1. A method comprising:
   determining, by a computing device, based on a type of a browser, a current playback period of a streaming session;
   determining, based on the current playback period and an expected playback period of the streaming session, one or more unsynchronized portions of the streaming session; and
   causing, based on the one or more unsynchronized portions, a buffer associated with the browser to store one or more content segments associated with the streaming session.

2. The method of claim 1, further comprising determining a plurality of playback periods associated with the streaming session.

3. The method of claim 2, further comprising determining, based on an audio content segment of the streaming session having a duration that differs from a duration of a video content segment of the streaming session, a gap in audio for a playback period of the plurality of playback periods.

4. The method of claim 2, further comprising determining, based on a quantity of the plurality of playback periods, playback of an audio content segment associated with a first playback period of the plurality of playback periods during playback of a second playback period of the plurality of playback periods.

5. The method of claim 1, further comprising:
   determining, based on identifying information from a manifest file associated with the streaming session, the expected playback period; and
   determining, based on a comparison between the current playback period and the expected playback period, the one or more unsynchronized portions of the streaming session.

6. The method of claim 1, further comprising determining a type of recovery mechanism associated with the browser.

7. The method of claim 1, wherein causing the buffer associated with the browser to store the one or more content segments associated with the streaming session comprises storing, by an intermediate buffer and based on the type of the browser, a plurality of audio content segments and a plurality of video content segments.

8. The method of claim 1, wherein the buffer is an intermediate buffer and wherein the method further comprises:
flushing a source buffer associated with the current playback period; and
storing a plurality of audio content segments and a plurality of video content segments in the source buffer.

9. One or more non-transitory computer-readable media storing processor-executable instructions that, when executed by at least one processor, cause the at least one processor to:
determine, by a computing device, based on a type of a browser, a current playback period of a streaming session;
determine, based on the current playback period and an expected playback period of the streaming session, one or more unsynchronized portions of the streaming session; and
cause, based on the one or more unsynchronized portions, a buffer associated with the browser to store one or more content segments associated with the streaming session.

10. The non-transitory computer-readable media of claim 9, wherein the processor-executable instructions, when executed by the at least one processor, further cause the at least one processor to determine a plurality of playback periods associated with the streaming session.

11. The non-transitory computer-readable media of claim 10, wherein the processor-executable instructions, when executed by the at least one processor, further cause the at least one processor to determine, based on an audio content segment of the streaming session having a duration that differs from a duration of a video content segment of the streaming session, a gap in audio for a playback period of the plurality of playback periods.

12. The non-transitory computer-readable media of claim 10, wherein the processor-executable instructions, when executed by the at least one processor, further cause the at least one processor to determine, based on a quantity of the plurality of playback periods, playback of an audio content segment associated with a first playback period of the plurality of playback periods during playback of a second playback period of the plurality of playback periods.

13. The non-transitory computer-readable media of claim 9, wherein the processor-executable instructions, when executed by the at least one processor, further cause the at least one processor to:
determine, based on identifying information from a manifest file associated with the streaming session, the expected playback period; and
determine, based on a comparison between the current playback period and the expected playback period, the one or more unsynchronized portions of the streaming session.

14. The non-transitory computer-readable media of claim 9, wherein the processor-executable instructions, when executed by the at least one processor, further cause the at least one processor to determine a type of recovery mechanism associated with the browser.

15. The non-transitory computer-readable media of claim 9, wherein the processor-executable instructions that, when executed by the at least one processor, cause the at least one processor to cause the buffer associated with the browser to store the one or more content segments associated with the streaming session, further cause the at least one processor to store, by an intermediate buffer and based on the type of the browser, a plurality of audio content segments and a plurality of video content segments.

16. The non-transitory computer-readable media of claim 9, wherein the buffer is an intermediate buffer and wherein the processor-executable instructions, when executed by the at least one processor, further cause the at least one processor to:
flush a source buffer associated with the current playback period; and
store a plurality of audio content segments and a plurality of video content segments in the source buffer.

17. A system comprising:
a user device configure to output a browser; and
a computing device configured to:
determine, based on a type of the browser, a current playback period of a streaming session;
determine, based on the current playback period and an expected playback period of the streaming session, one or more unsynchronized portions of the streaming session; and
cause, based on the one or more unsynchronized portions, a buffer associated with the browser to store one or more content segments associated with the streaming session.

18. The system of claim 17, wherein the computing device is further configured to determine a plurality of playback periods associated with the streaming session.

19. The system of claim 18, wherein the computing device is further configured to determine, based on an audio content segment of the streaming session having a duration that differs from a duration of a video content segment of the streaming session, a gap in audio for a playback period of the plurality of playback periods.

20. The system of claim 18, wherein the computing device is further configured to determine, based on a quantity of the plurality of playback periods, playback of an audio content segment associated with a first playback period of the plurality of playback periods during playback of a second playback period of the plurality of playback periods.

21. The system of claim 17, wherein the computing device is further configured to:
determine, based on identifying information from a manifest file associated with the streaming session, the expected playback period; and
determine, based on a comparison between the current playback period and the expected playback period, the one or more unsynchronized portions of the streaming session.

22. The system of claim 17, wherein the computing device is further configured to determine a type of recovery mechanism associated with the browser.

23. The system of claim 17, wherein the computing device is configured to causing the buffer associated with the browser to store the one or more content segments associated with the streaming session, the computing device is further configured to store, by an intermediate buffer and based on the type of the browser, a plurality of audio content segments and a plurality of video content segments.

24. The system of claim 17, wherein the buffer is an intermediate buffer and wherein the computing device is further configured to:

flush a source buffer associated with the current playback period; and store a plurality of audio content segments and a plurality of video content segments in the source buffer.

* * * * *